United States Patent
Siomina et al.

(10) Patent No.: US 10,856,161 B2
(45) Date of Patent: Dec. 1, 2020

(54) CONTROLLING LEAN CARRIER OPERATION WITH CONFIGURABLE CONTROL CHANNEL MONITORING

(71) Applicant: Telefonaktiebolaget LM Ericsson (publ), Stockholm (SE)

(72) Inventors: Iana Siomina, Täby (SE); Muhammad Kazmi, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/466,805

(22) PCT Filed: Dec. 5, 2017

(86) PCT No.: PCT/IB2017/057661
§ 371 (c)(1),
(2) Date: Jun. 5, 2019

(87) PCT Pub. No.: WO2018/104866
PCT Pub. Date: Jun. 14, 2018

(65) Prior Publication Data
US 2019/0349799 A1    Nov. 14, 2019

Related U.S. Application Data

(60) Provisional application No. 62/430,163, filed on Dec. 5, 2016.

(51) Int. Cl.
*H04W 24/08* (2009.01)
*H04L 1/08* (2006.01)
(Continued)

(52) U.S. Cl.
CPC ............... *H04W 24/08* (2013.01); *H04L 1/08* (2013.01); *H04L 1/1887* (2013.01); *H04L 5/005* (2013.01);
(Continued)

(58) Field of Classification Search
CPC .. H04W 72/0406; H04W 4/70; H04W 56/001
See application file for complete search history.

(56) References Cited

U.S. PATENT DOCUMENTS

2011/0230144 A1*  9/2011  Siomina ................ H04L 5/0048
                                                                   455/68
2012/0294239 A1* 11/2012  Lindoff ............. H04W 52/0232
                                                                   370/328
(Continued)

FOREIGN PATENT DOCUMENTS

EP    3 200 412 A1    8/2017
RU    2 520 358 C1    6/2014
(Continued)

OTHER PUBLICATIONS

International Search Report and Written Opinion of the International Searching Authority dated Mar. 14, 2018 issued in PCT Application No. PCT/IB2017/057661, consisting of 18 pages.
(Continued)

*Primary Examiner* — Hassan Kizou
*Assistant Examiner* — Hector Reyes
(74) *Attorney, Agent, or Firm* — Christopher & Weisberg, P.A.

(57) ABSTRACT

A measuring node, a controlling node and methods for controlling and/or using lean carrier operation with configurable control channel monitoring are disclosed. The method includes determining a presence of at least one user equipment operating based on a configurable control channel monitoring, and controlling a bandwidth based on the determining the presence of at least one user equipment operating based on a configurable control channel monitoring.

35 Claims, 9 Drawing Sheets

(51) Int. Cl.
  *H04L 1/18*       (2006.01)
  *H04L 5/00*       (2006.01)
  *H04W 8/00*       (2009.01)
  *H04W 76/28*          (2018.01)
  *H04W 52/02*          (2009.01)

(52) U.S. Cl.
  CPC .......... *H04L 5/0055* (2013.01); *H04L 5/0064* (2013.01); *H04W 8/005* (2013.01); *H04W 52/0206* (2013.01); *H04W 76/28* (2018.02)

(56) References Cited

U.S. PATENT DOCUMENTS

| | | | |
|---|---|---|---|
| 2013/0286928 | A1 | 10/2013 | Xu et al. |
| 2013/0308481 | A1* | 11/2013 | Kazmi .................. H04W 48/16 370/252 |
| 2014/0254504 | A1 | 9/2014 | Bashar et al. |
| 2018/0139763 | A1* | 5/2018 | Bitra ..................... H04L 5/0048 |

FOREIGN PATENT DOCUMENTS

| | | |
|---|---|---|
| WO | 2011/115546 A1 | 9/2011 |
| WO | 2016/048055 A1 | 3/2016 |
| WO | 2016/071010 A1 | 5/2016 |

OTHER PUBLICATIONS

International Preliminary Report on Patentability dated Jan. 7, 2019 issued in PCT Application No. PCT/IB2017/057661, consisting of 34 pages.

Ericsson, 3GPP TSG RAN WG4 Meeting #84 R4-1707711, Berlin, Germany, Aug. 21-25, 2017; Agenda Item: 8.29.1; Document for Discussion; On the Scenarios for Network-Based CRS Interference Mitigation, consisting of 4 pages.

Ericsson, 3GPP TSG-RAN WG4 Meeting #81 R4-1610351, Reno, Nevada, Nov. 14-18, 2016; Agenda Item: 13; Document for Information; New Work Item on UE Requirements for Network-Based CRS Mitigation for LTE, consisting of 7 pages.

Ericsson, 3GPP TSG RAN WG4 Meeting #81 R4-1610352, Reno, Nevada, Nov. 14-18, 2016; Agenda Item: 13, Motivation for New Work Item on Network Based CRS Mitigation, consisting of 5 pages.

Ericsson, 3GPP TSG RAN Meeting #74 RP-162286, Vienna, Austria, Dec. 5-8, 2016; Agenda Item: 10.1.1, Motivation for New WI on Even Further Enhanced MTC for LTE, consisting of 8 pages.

Huawei, HiSilicon, 3GPP TSG RAN WG1 Meeting #78b R1-143922, Ljubljana, Slovenia, Oct. 6-10, 2014; Agenda Item: 7.3.1.1.2; Document for Discussion and Decision; Coverage Enhancement for MTC UEs—Capability or Mimicry? consisting of 6 pages.

Qualcomm Incorporated, 3GPP TSG RAN WG1 Meeting #87 R1-1613255, Reno, USA, Nov. 14-18, 2016, Number of MPDCCH-PRB Sets, consisting of 8 pages.

ETSI 3GPP TS 36.213 Version 13.3.0 (Nov. 2016) Release 13, LTE; Evolved Universal Terrestrial Radio Access (E-UTRA); Physical Layer Procedures, consisting of 387 pages.

3GPP TS 36.331 V14.4.0 (Sep. 2017) 3rd Generation Partnership Project; Technical Specification Group Radio Access Network; Evolved Universal Terrestrial Radio Access (E-UTRA); Radio Resource Control (RRC); Protocol Specification (Release 14), consisting of 753 pages.

3GPP TS 36.211 V14.4.0 (Sep. 2017) 3rd Generation Partnership Project; Technical Specification Group Radio Access Network; Evolved Universal Terrestrial Radio Access (E-UTRA); Physical Channels and Modulation (Release 14), consisting of 197 pages.

International Search Report and Written Opinion of the International Searching Authority dated Feb. 27, 2018 issued in PCT Application No. PCT/IB2017/057656, consisting of 12 pages.

International Preliminary Report on Patentability dated Feb. 27, 2019 issued in PCT Application No. PCT/IB2017/057656, consisting of 31 pages.

3GPP TS 36.331 V13.0.0 (Dec. 2015) 3rd Generation Partnership Project; Technical Specification Group Radio Access Network; Evolved Universal Terrestrial Radio Access (E-UTRA) Radio Resource Control (RRC); Protocol Specification (Release 13), consisting of 507 pages.

ETSI TS 136.214 V14.3.0 (Oct. 2017) LTE; Evolved Universal Terrestrial Radio Access (E-UTRA); Physical Layer; Measurements (3GPP TS 36.214 V14.3.0 Release14), consisting of 25 pages.

ETSI TS 136.355 V14.3.0 (Oct. 2017) LTE; Evolved Universal Terrestrial Radio Access (E-UTRA); LTE Positioning Protocol (LPP) (3GPP TS 36.355 V14.3.0 Release 14), consisting of 172 pages.

ETSI TS 136.101 V14.5.0 (Nov. 2017) LTE; Evolved Universal Terrestrial Radio Access (E-UTRA); User Equipment (UE) Radio Transmission and Reception (3GPP TS 36.101 V14.5.0 Release 14), consisting of 1512 pages.

Russian Office Action and Search Report issued in corresponding Russian Application No. 2019120811/07(040691) dated Nov. 25, 2019, consisting of 15 pages.

European Search Report dated Dec. 2, 2019 issued in European Patent Application No. 17 822 025.7, consisting of 7 pages.

European Examination Report dated Jun. 12, 2020 issued in European Patent Application No. 17 822 025.7, consisting of 8 pages.

* cited by examiner

CONTROLLING LEAN CARRIER OPERATION WITH CONFIGURABLE CONTROL CHANNEL MONITORING

CROSS-REFERENCE TO RELATED APPLICATIONS

This application is a Submission Under 35 U.S.C. § 371 for U.S. National Stage Patent Application of International Application No.: PCT/IB2017/057661, filed Dec. 5, 2017 entitled "CONTROLLING LEAN CARRIER OPERATION WITH CONFIGURABLE CONTROL CHANNEL MONITORING," which claims priority to U.S. Provisional Application No. 62/430,163, filed Dec. 5, 2016, entitled "CONTROLLING LEAN CARRIER OPERATION WITH CONFIGURABLE CONTROL CHANNEL MONITORING," the entireties of both of which are incorporated herein by reference.

TECHNICAL FIELD

Wireless communication and in particular, methods and apparatuses for controlling and/or using lean carrier operation with configurable control channel monitoring.

BACKGROUND

Power consumption is important for user equipment (UE) using battery or an external power supply and the importance of power consumption increases with the continued growth of device populations and more demanding use cases. The importance can be illustrated by the following scenarios, e.g.:
  For Machine-to-Machine (M2M) use cases, such as, for example, sensors that run on a battery, a major cost can be on-site exchange (or charging) of the batteries for a large amount of M2M devices; the battery lifetime may even determine the device's lifetime if it is not foreseen or practical to charge or replace the battery; and
  Even for scenarios where UEs may consume power from an external power supply, it may be desirable to consume less power for energy efficiency purposes.

To facilitate power consumption in the UE, 3GPP defined Discontinuous Reception (DRX) operation for UEs in RRC_CONNECTED and RRC_IDLE, and recently also defined eDRX operation for UEs in RRC_CONNECTED and RRC_IDLE in Long-Term Evolution (LTE), as well as eDRX operation for UEs in RRC_IDLE in Universal Terrestrial Radio Access (UTRA).

To enable power consumption in eNodeBs (eNBs), a work item (WI) on network-based Cell-Specific Reference Signal (CRS) mitigation is being proposed in 3GPP in R4-1610351 New Work Item on UE requirements for network-based CRS mitigation for LTE, Ericsson, November 2016 and R4-1610352 Motivation for New Work Item on Network Based CRS Mitigation, Ericsson, November 2016, both publicly available at http://www.3GPP.org Network-Based CRS Mitigation Right from the start in Rel-8, LTE was designed to rely on Cell-specific Reference Signals (CRSs), which are transmitted using full system bandwidth and in all Downlink (DL) subframes of an LTE radio frame. CRS serves many important purposes such as cell search/mobility, time/frequency synchronization, channel estimation and radio resource management.

However, CRS is currently transmitted independently of the actual load in the network or cell and as such it causes a considerable interference floor in cellular networks. Especially in times of low and medium network load, transmitting less CRS leads to lower inter-cell interference levels, which directly results in significantly higher UE data rates. Network-based CRS mitigation is especially powerful when combined with higher order modulation, e.g., 256QAM, as the cell coverage area for higher order modulation is significantly increased. In addition, the always-on CRS transmissions require eNBs to stay 'on' all the time, whereas network-based CRS mitigation allows eNBs to conserve energy.

Removing CRS completely, e.g., as it has been done for downlink (DL) License Assisted Access (LAA) communications using Frame Structure 3, and as it is envisioned for the 5G New Radio, could have the greatest effect, but it renders the LTE carrier non-backwards compatible. In other words, removing CRSs completely could mean that legacy UEs would not be able to use such a carrier. However, CRS can also be reduced cautiously and selectively such that legacy UEs can still be served and that inter-cell interference can be significantly reduced.

For frequency domain CRS reduction, one can distinguish between RRC IDLE and RRC CONNECTED mode operation. For supporting UEs in IDLE mode, CRS can be reduced to the inner 6 physical resource blocks (PRBs) as UEs can be configured to only use those PRBs for cell selection. However, during paging occasions, system information transmissions, and random access windows, CRS should be transmitted using full bandwidth. For supporting UEs in CONNECTED mode, CRS should be transmitted full bandwidth whenever a UE is active. But, for instance, during (e)DRX sleep periods, CRS may not be needed and can be reduced.

Frequency domain CRS reduction can be accompanied by time domain CRS reduction by means of configuring Multi-Broadcast Single Frequency Network (MBSFN) subframes, which contain CRS only in 1 or 2 out of 14 Orthogonal Frequency-Division Multiplexing (OFDM)-symbols.

FIG. 1 illustrates an example operation with network-based CRS mitigation, where "muted CRS" refers to using the shortened CRS bandwidth (center 6 RBs).

Machine-Type Communication (MTC)/Enhanced MTC (eMTC)/Further Enhanced (FeMTC)

The MTC device is expected to be of low cost and low complexity. A low complexity UE for M2M operation may implement one or more low cost features such as, for example, smaller downlink and uplink maximum transport block size (e.g., 1000 bits) and/or reduced downlink channel bandwidth of, for example, 1.4 MHz for data channel (e.g., Physical Downlink Shared Channel (PDSCH)). A low cost UE may also include a half-duplex-frequency division duplex (HD-FDD) and one or more of the following additional features: single receiver (1 Rx) at the UE, smaller downlink and/or uplink maximum transport block size (e.g., 1000 bits), and reduced downlink channel bandwidth of 1.4 MHz for the data channel. The low cost UE may also be referred to as low complexity UE.

The path loss between an M2M device and the base station can be very large in some scenarios, such as when used as a sensor or metering device located in a remote location such as in the basement of the building. In such scenarios, the reception of signal from base station is very challenging. For example, the path loss can be worse than 20 dB compared to normal cellular network operation. In order to cope with such challenges, the coverage in uplink and/or in downlink may have to be substantially enhanced. This is realized by employing one or a plurality of advanced techniques in the UE and/or in the radio network node for enhancing the coverage. Some non-limiting examples of such advanced techniques include (but are not limited to) transmit power boosting, repetition of transmitted signal, applying additional redundancy to the transmitted signal, use of advanced/enhanced receiver, etc. In general, when employing such coverage enhancing techniques the machine to machine (M2M) communication is regarded to be operating in 'coverage enhancing mode'.

A low complexity MTC UE (e.g., UE with 1 Rx) may also be capable of supporting an enhanced coverage mode of operation, e.g., coverage enhanced mode B (CEModeB), and/or coverage enhanced mode A (CEModeA).

Example 1: Multi-Shot Reception for MTC Physical Downlink Control Channel (MPDCCH)

The eNB will broadcast the system information about the maximum number of MPDCCH or Narrowband Primary Downlink Control Channel (NPDCCH) repetitions used for paging in the cell, which would be as high as 256 subframes for MPDCCH and 2048 for NPDCCH. The actual number of MPDCCH and NPDCCH repetitions is up to the eNB. FIG. 2 illustrates the relation between the maximum number of MPDCCH repetitions and the actual number of MPDDCH repetitions. When eNB broadcasts the maximum number of MPDCCH repetitions, given by $r_{max}$ in FIG. 2, there are up to four (4) options for the numbers of transmissions, which are indicated in FIG. 2 by r1, r2, r3, and r4. Because the UE does not know the actual repetition numbers, r1, r2, r3 or r4, the UE should try decoding MPDCCH at each position.

The repetition level (e.g., r1, r2, r3, or r4, as in the example shown herein below in Table 1) may be derived based on the maximum repetition level (e.g., $r_{max}$ as in Table 1 below). The parameter $r_{max}$ is signaled to the UE via Radio Resource Control (RRC).

TABLE 1

Repetition levels for Type1-MPDCCH common search space

| $r_{max}$ | r1 | r2 | r3 | r4 |
|---|---|---|---|---|
| 256 | 2 | 16 | 64 | 256 |
| 128 | 2 | 16 | 64 | 128 |
| 64 | 2 | 8 | 32 | 64 |
| 32 | 1 | 4 | 16 | 32 |
| 16 | 1 | 4 | 8 | 16 |
| 8 | 1 | 2 | 4 | 8 |
| 4 | 1 | 2 | 4 | — |
| 2 | 1 | 2 | — | — |
| 1 | 1 | — | — | — |

Configurable MPDCCH Monitoring

In Rel-13, an additional assistance for the UE to determine MPDCCH resources was introduced. This is by means of a G parameter specified as follows in the below portions of the Technical Specification for 3GPP:

TS 36.213, v13.3.0:

For MPDCCH UE-specific search space, Type0-common search space, and Type2-common search space locations of starting subframe k are given by k=$k_b$ where $k_b$ is the $b^{th}$ consecutive Bandwidth reduced Low Complexity/Coverage Enhancement (BL/CE) DL subframe from subframe k0, and b=u·rj, and $$u = 0, 1, \ldots \frac{r_{max}}{rj} - 1,$$

and j∈{1, 2, 3, 4}, where
subframe k0 is a subframe satisfying the condition $(10n_f + \lfloor n_s/2 \rfloor) \bmod T = 0$, where $T = r_{max} \cdot G$ For MPDCCH UE-specific search space, Type0-common search space G is given by the higher layer parameter mPDCCH-startSF-UESS, For Type2-common search space, G is given by the higher layer parameter mPDCCH-startSF-CSS-RA-r13, $r_{max}$ is given by higher layer parameter mPDCCH-NumRepetition, and r1, r2, r3, r4 are given in Table 9.1.5-3 of the Technical Specification.

A BL/CE UE is not expected to be configured with values of $r_{max}$ and G that result in non-integer values of T.

```
TS 36.331:
    mpdcch-config-r13                    CHOICE {
        release                                                NULL,
        setup
    SEQUENCE {
                            csi-NumRepetitionCE-r13
    ENUMERATED {sf1, sf2, sf4, sf8, sf16, sf32},
                            mpdcch-pdsch-HoppingConfig-r13    ENUMERATED
{on,off},
                            mpdcch-StartSF-UESS-r13           CHOICE {
                                fdd-r13
    ENUMERATED {v1, v1dot5, v2, v2dot5, v4,
                                v5, v8, v10},
                                tdd-r13
    ENUMERATED {v1, v2, v4, v5, v8, v10,
                                v20, spare1}
                            },
                            mpdcch-NumRepetition-r13          ENUMERATED
{r1, r2, r4, r8, r16,
```

```
          r32, r64, r128, r256},
        mpdcch-Narrowband-r13        INTEGER
(1.. maxAvailNarrowBands-r13)
    }
  }
                    OPTIONAL -- Need ON
``` mpdcch-StartSF-UESS:

Starting subframe configuration for an MPDCCH UE-specific search space, see TS 36.211 [21]. Value v1 corresponds to 1, value v1dot5 corresponds to 1.5, and so on.

The Information Element (IE) PRACH-ConfigSIB and IE PRACH-Config are used to specify the Physical Random Access Channel (PRACH) configuration in the system information and in the mobility control information, respectively. These control elements comprise mpdcch-startSF-CSS-RA:

```
    PRACH-ConfigSIB-v1310 ::=      SEQUENCE {
      rsrp-ThresholdsPrachInfoList-r13  RSRP-ThresholdsPrachInfoList-
r13,
      mpdcch-startSF-CSS-RA-r13    CHOICE {
        fdd-r13
        ENUMERATED {v1, v1dot5, v2, v2dot5, v4, v5, v8,
        v10},
          tdd-r13
        ENUMERATED {v1, v2, v4, v5, v8, v10, v20, spare}
      }
                                   OPTIONAL, -- Cond
MP
      prach-HoppingOffset-r13      INTEGER (0..94)
                    OPTIONAL, -- Need OR
      prach-ParametersListCE-r13   PRACH-ParametersListCE-r13
}
PRACH-Config ::=                   SEQUENCE {
      rootSequenceIndex            INTEGER (0..837),
      prach-ConfigInfo             PRACH-ConfigInfo
            OPTIONAL -- Need ON
}
PRACH-Config-v1310 ::=             SEQUENCE {
      rsrp-ThresholdsPrachInfoList-r13  RSRP-ThresholdsPrachInfoList-
r13    OPTIONAL, -- Cond HO
      mpdcch-startSF-CSS-RA-r13    CHOICE {
        fdd-r13
        ENUMERATED {v1, v1dot5 v2, v2dot5, v4, v5, v8,
        v10},
          tdd-r13
        ENUMERATED {v1, v2, v4, v5, v8, v10, v20, spare}
      }
                                   OPTIONAL, -- Cond
MP
      prach-HoppingOffset-r13      INTEGER (0..94)
                    OPTIONAL, -- Need OR
      prach-ParametersListCE-r13   PRACH-ParametersListCE-r13
            OPTIONAL, -- Cond MP
      initial-CE-level-r13         INTEGER (0..3)
      OPTIONAL -- Need OR
}
``` mpdcch-startSF-CSS-RA:

Starting subframe configuration for MPDCCH common search space (CSS), including Random Access Response (RAR), Msg3 retransmission, PDSCH with contention resolution and PDSCH with RRCConnectionSetup, see TS 36.211 [21] and TS 36.213 [23]. Value v1 corresponds to 1, value v1 dot5 corresponds to 1.5, and so on.

It should be noted that the parameter G, $r_{max}$, and repetition levels (r1, r2, r3, and r4) discussed in this section are also discussed herein below using the same variables for the sake of clarity. However, it is contemplated that some embodiments that may use such parameters may utilize different variables, or slight variations of such variables (e.g., Rmax or R1) to identify these parameters.

SUMMARY

Embodiments of the present disclosure may improve performance of a wireless communication network. Certain problems may arise in the existing art and may include the following:

Existing approaches for operating lean carrier are not designed to adapt to the configurable control channel monitoring;

Also, currently different UEs may have different configurations for the configurable channel monitoring, which may in some scenarios result in difficulty in reducing the bandwidth on a carrier with such UEs.

Certain embodiments according to aspects of the present disclosure may provide solutions to these and/or other problems.

According to a first aspect of the present disclosure, methods for a controlling node (e.g., a radio network node, a core network node, base station (BS), radio network controller, Self-Organizing Network (SON) node, O&M node, Mobile Management Entity (MME), etc.) are provided. Certain embodiments of such methods comprise the steps of:

Step 1 (optional): Indicating to at least one other node (e.g., UE or a network node) the controlling node's ability to operate according to one or more embodiments described herein;

Step 2: Determining the presence in an area of at least one UE that may be operating based on a configurable control channel monitoring. Optionally, the determining may further comprise determining at least one parameter characterizing configuration control channel monitoring of the at least one UE.

Step 3: Controlling a bandwidth (BW) based on a result of the determining Optionally, the controlling may further comprise determining a subset of time resources over which the BW will be adapted based on a result of the determining Optionally, the controlling may further comprise controlling of the time resources associated with configurable control channel monitoring for the at least one UE.

Step 4 (optional): Informing at least one other node (e.g., UE or another network node) about the bandwidth control.

According to a second aspect of the present disclosure, methods for a measuring node (e.g., UE or a radio network node, etc.), are provided. Certain embodiments of such methods comprise the steps of:

Step 5: Determining that a carrier is a lean carrier;

Step 6: Obtaining the bandwidth of at least one signal/channel to be received by the UE on the lean carrier in resources associated with configurable control channel monitoring;

Step 7: Performing one or more operational tasks, based on the obtained bandwidth; and Step 8 (optional): Indicating to one or more other nodes a result associated with the obtained bandwidth.

The order of steps in some of the embodiments described herein may be different.

Certain embodiments according to aspects of the present disclosure may provide one or more of the following technical advantages: the possibility to operate lean carrier in a more efficient way also in the presence of MTC UE(s) and/or UE(s) with configurable channel monitoring.

Other advantages will be apparent to persons of ordinary skill in the art.

Some embodiments advantageously provide methods and apparatuses for controlling and/or using lean carrier operation with configurable control channel monitoring.

According to one aspect of the present disclosure, a method for a controlling node is provided that includes determining a presence of at least one user equipment operating based on a configurable control channel monitoring; and controlling a bandwidth based on the determining the presence of at least one user equipment operating based on the configurable control channel monitoring.

According to this aspect of the present disclosure, in some embodiments, determining the presence of the at least one user equipment operating based on the configurable control channel monitoring comprises determining at least one parameter at least partially characterizing the configurable control channel monitoring of the at least one user equipment. In some embodiments, the at least one parameter at least partially characterizing the configurable control channel monitoring of the at least one user equipment includes at least one of a parameter G and $r_{max}$, $r_{max}$ representing a maximum number of repetitions associated with a control channel and G representing an indicator used for indicating control channel resources. In some embodiments, the at least one parameter at least partially characterizing the configurable control channel monitoring of the at least one user equipment includes at least one of a repetition level of a set of repetition levels associated with a control channel and an offset for a Machine-Type Communication Downlink Control Channel (MPDCCH) monitoring window. In some embodiments, controlling the bandwidth based on determining the presence of the at least one user equipment operating based on the configurable control channel monitoring comprises controlling the bandwidth of a cell-specific reference signal, CRS, based on determining the presence of the at least one user equipment operating based on the configurable control channel monitoring.

In some embodiments, controlling the bandwidth based on determining the presence of the at least one user equipment operating based on the configurable control channel monitoring comprises using a first bandwidth value for a signal if the presence of the at least one user equipment operating based on the configurable control channel monitoring is not detected and using a second bandwidth value for the signal if the presence of the at least one user equipment operating based on the configurable control channel monitoring is detected, the second bandwidth value being different from the first bandwidth value. In some embodiments, the second bandwidth value is greater than the first bandwidth value. In some embodiments, determining the presence of the at least one user equipment operating based on the configurable control channel monitoring comprises determining a number of user equipments in an area operating based on the configurable control channel monitoring; and controlling the bandwidth based on determining the presence of the at least one user equipment operating based on the configurable control channel monitoring comprises using a first bandwidth value if the number of user equipments in the area operating based on the configurable control channel monitoring at least meets a pre-defined value and using a second bandwidth value if the number of user equipments in the area operating based on the configurable control channel monitoring does not at least meet the pre-defined value, the second bandwidth value being different from the first bandwidth value. In some embodiments, controlling the bandwidth based on determining the presence of the at least one user equipment operating based on the configurable control channel monitoring comprises: determining a first subset of time resources and a second subset of time resources; and using a first bandwidth value for the first subset of time resources and a second bandwidth value for the second set of time resources, the second subset being different from the first subset and the second bandwidth value being different from the first bandwidth value. In some embodiments, the method further includes at least one of: indicating to at least one other node the controlling node's ability to control the bandwidth based on determining a presence of at least one user equipment operating based on a configurable control channel monitoring; and informing at least one other node of the controlled bandwidth.

According to another aspect of the present disclosure, a method for a measuring node includes obtaining a bandwidth of at least one signal in at least one resource associated with configurable control channel monitoring, the bandwidth being controlled based on a determined presence of at least one user equipment operating based on the configurable control channel monitoring; and performing at least one operational task based on the obtained bandwidth.

According to this aspect of the present disclosure, in some embodiments, the determined presence of the at least one user equipment operating based on the configurable control channel monitoring is determined by determining at least one parameter at least partially characterizing the configurable control channel monitoring. In some embodiments, the at least one parameter at least partially characterizing the configurable control channel monitoring of the at least one user equipment includes at least one of: a parameter G, G representing an indicator used for indicating control channel resources; a parameter $r_{max}$, $r_{max}$ representing a maximum number of repetitions associated with a control channel; a repetition level of a set of repetition levels associated with a control channel; and an offset for a Machine-Type Communication Downlink Control Channel (MPDCCH) monitoring window. In some embodiments, the bandwidth of the at least one signal is a bandwidth of a cell-specific reference signal (CRS). In some embodiments, the obtained bandwidth of the at least one signal in the at least one resource associated with the configurable control channel monitoring is different from a second bandwidth of at least one other signal in at least one other resource that is not associated with the configurable control channel monitoring. In some embodiments, the bandwidth is further controlled based on whether a number of user equipments operating based on the configurable control channel monitoring at least meets a pre-defined value. In some embodiments, obtaining the bandwidth of the at least one signal in the at least one resource associated with the configurable control channel monitoring comprises obtaining at least one time resource in which the obtained bandwidth applies. In some embodiments, the method further comprising at least one of: determining that a carrier associated with the at least one signal is a lean carrier; and indicating to at least one other node a result of the obtaining the bandwidth. In some embodiments, performing the at least one operational task based on the obtained bandwidth comprises at least one of performing a radio measurement, a timing acquisition, a control channel demodulation, and a control channel decoding.

According to yet another aspect of the present disclosure, a controlling node includes circuitry, the circuitry configured to: determine a presence of at least one user equipment operating based on a configurable control channel monitoring; and control a bandwidth based on the determining the presence of the at least one user equipment operating based on the configurable control channel monitoring.

According to this aspect of the present disclosure, in some embodiments, the circuitry is further configured to determine at least one parameter at least partially characterizing the configurable control channel monitoring of the at least one user equipment. In some embodiments, the at least one parameter at least partially characterizing the configurable control channel monitoring of the at least one user equipment includes at least one of a parameter G and $r_{max}$, $r_{max}$ representing a maximum number of repetitions associated with a control channel and G representing an indicator used for indicating control channel resources. In some embodiments, the at least one parameter at least partially characterizing the configurable control channel monitoring of the at least one user equipment includes at least one of a repetition level of a set of repetition levels associated with a control channel and an offset for a Machine-Type Communication Downlink Control Channel (MPDCCH) monitoring window. In some embodiments, the circuitry is further configured to control a bandwidth of a cell-specific reference signal (CRS) based on determining the presence of the at least one user equipment operating based on the configurable control channel monitoring. In some embodiments, the circuitry is further configured to use a first bandwidth value for a signal if the presence of the at least one user equipment operating based on the configurable control channel monitoring is not detected and using a second bandwidth value for the signal if the presence of the at least one user equipment operating based on the configurable control channel monitoring is detected, the second bandwidth value being different from the first bandwidth value. In some embodiments, the second bandwidth value is greater than the first bandwidth value. In some embodiments, the circuitry is further configured to: determine a number of user equipments in an area operating based on the configurable control channel monitoring; and use a first bandwidth value if the number of user equipments in the area operating based on the configurable control channel monitoring at least meets a pre-defined value and using a second bandwidth value if the number of user equipments in the area operating based on the configurable control channel monitoring does not at least meet the pre-defined value, the second bandwidth value being different from the first bandwidth value. In some embodiments, the circuitry is further configured to: determine a first subset of time resources and a second subset of time resources; and use a first bandwidth value for the first subset of time resources and a second bandwidth value for the second set of time resources, the second subset being different from the first subset and the second bandwidth value being different from the first bandwidth value. In some embodiments, the circuitry is further configured to at least one of: indicate to at least one other node the controlling node's ability to control the bandwidth based on determining the presence of the at least one user equipment operating based on the configurable control channel monitoring; and inform at least one other node of the controlled bandwidth.

According to another aspect of the present disclosure, a measuring node includes circuitry, the circuitry configured to: obtain a bandwidth of at least one signal in at least one resource associated with configurable control channel monitoring, the bandwidth being controlled based on a determined presence of at least one user equipment operating based on the configurable control channel monitoring; and perform at least one operational task based on the obtained bandwidth.

According to this aspect of the present disclosure, in some embodiments, the determined presence of the at least one user equipment operating based on the configurable control channel monitoring is determined by determining at least one parameter at least partially characterizing the configurable control channel monitoring. In some embodiments, the at least one parameter at least partially characterizing the configurable control channel monitoring of the at least one user equipment includes at least one of: a parameter G, G representing an indicator used for indicating control channel resources; a parameter and $r_{max}$, $r_{max}$ representing a maximum number of repetitions associated with a control channel; a repetition level of a set of repetition levels associated with a control channel; and an offset for a Machine-Type Communication Downlink Control Channel (MPDCCH) monitoring window. In some embodiments, the bandwidth of the at least one signal is a bandwidth of a cell-specific reference signal (CRS). In some embodiments, the obtained bandwidth of the at least one signal in the at least one resource associated with the configurable control channel monitoring is different from a second bandwidth of at least one other signal in at least one other resource that is not associated with the configurable control channel monitoring. In some embodiments, the bandwidth is further controlled based on whether a number of user equipments in an area operating based on the configurable control channel monitoring at least meets a pre-defined value. In some embodiments, the circuitry is further configured to obtain at least one time resource in which the obtained bandwidth applies. In some embodiments, the circuitry is further configured to at least one of: determine that a carrier associated with the at least one signal is a lean carrier; and indicate to at least one other node a result of obtaining the bandwidth. In some embodiments, the circuitry is further configured to perform at least one operational task based on the obtained bandwidth by at least one of performing a radio measurement, a timing acquisition, a control channel demodulation, and a control channel decoding.

According to another aspect, a controlling node includes a determining module configured to determine a presence of at least one user equipment operating based on a configurable control channel monitoring; and a controlling module configured to control a bandwidth based on the determining the presence of at least one user equipment operating based on a configurable control channel monitoring.

According to yet another aspect, a measuring node includes an obtaining module configured to obtain a bandwidth of at least one signal in at least one resource associated with configurable control channel monitoring, the bandwidth being controlled based on a determined presence of at least one user equipment operating based on the configurable control channel monitoring; and a performing module configured to perform at least one operational task based on the obtained bandwidth.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
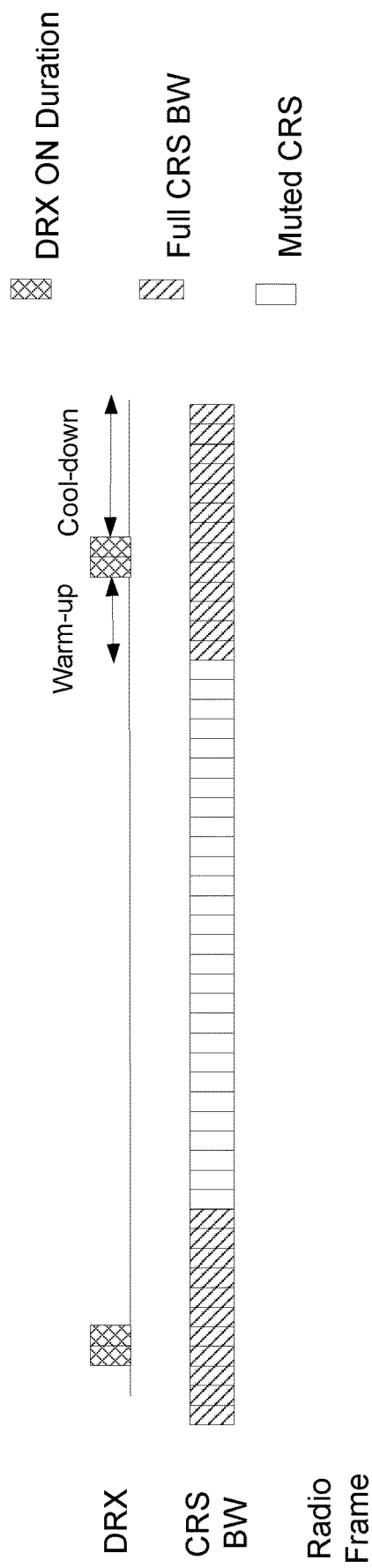
FIG. 1 illustrates an example operation with network-based CRS mitigation.
Figure 2:
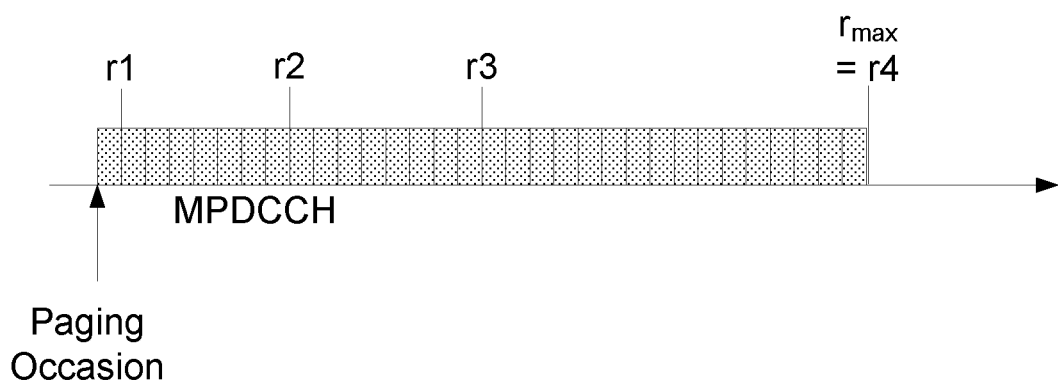
FIG. 2 illustrates an example relation of a maximum number of MPDCCH repetitions and an actual number of MPDCCH repetitions.

Before describing in detail exemplary embodiments, it is noted that the embodiments reside primarily in combinations of apparatus components and processing steps related to controlling and/or using lean carrier operation with configurable control channel monitoring. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Any two or more embodiments described in this document may be combined in any way with each other. Furthermore, even though the examples herein may be given in the LAA context, the embodiments described herein are not limited to LAA and can also apply in a more general case when the UE may need to configure measurement period adaptively to one or more conditions, e.g., channel quality, Ês/Iot, Signal-to-Interference-and-Noise Ratio (SINR), received signal quality, total interference or interference on a specific resource or from a specific interferer(s), etc. Other non-limiting examples where the described herein methods are particularly beneficial include measurements for DRX or extended-DRX (eDRX), and measurements in high speed train environments.

In some embodiments, a non-limiting term "UE" is used. The UE herein can be any type of wireless device capable of communicating with network node or another UE over radio signals. The UE may also be radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), Universal Serial Bus (USB) dongles, Customer Premises Equipment (CPE), etc.

Also in some embodiments, generic terminology "network node", is used. Network node can be any kind of network node which may comprise of a radio network node such as base station, radio base station, base transceiver station, base station controller, network controller, evolved Node B (eNB), Node B, multi-RAT base station, Multi-cell/multicast Coordination Entity (MCE), relay node, access point, radio access point, Remote Radio Unit (RRU), Remote Radio Head (RRH), a core network node (e.g., MME, SON node, a coordinating node, positioning node, Minimization of Drive Tests (MDT) node, etc.), or even an external node (e.g., 3rd party node, a node external to the current network), etc.

The term "radio node" used herein may be used to denote a UE or a radio network node.

The embodiments are applicable to single carrier as well as to multicarrier or carrier aggregation (CA) operation of the UE in which the UE is able to receive and/or transmit data to more than one serving cells. The term carrier aggregation (CA) is also called (e.g., interchangeably called) "multi-carrier system", "multi-cell operation", "multi-carrier operation", "multi-carrier" transmission and/or reception. In CA, one of the component carriers (CCs) is the primary component carrier (PCC) or simply primary carrier or even anchor carrier. The remaining CCs are called secondary component carrier (SCC) or simply secondary carriers or even supplementary carriers. The serving cell is interchangeably referred to as primary cell (PCell) or primary serving cell (PSC). Similarly the secondary serving cell is interchangeably referred to as secondary cell (SCell) or secondary serving cell (SSC).

The term "signaling" used herein may comprise any of: high-layer signaling (e.g., via RRC), lower-layer signaling (e.g., via a physical control channel or a broadcast channel), or a combination thereof. The signaling may be implicit or explicit. The signaling may further be unicast, multicast, or broadcast. The signaling may also be directly to another node or via a third node.

The term "measurement" herein refers to radio measurements. Some examples of the radio measurements are: signal strength or signal power measurements (e.g., Reference Signal Received Power (RSRP) or CSI-RSRP), signal quality measurements (e.g., Reference Signal Received Quality (RSRQ), SINR, RS-SINR), timing measurements (e.g., Rx-Tx, RSTD, Round Trip Time (RTT), Time of Arrival (TOA)), radio link monitoring measurements (RLM), cell detection, cell identification, cell (re)selection, CSI, Precoder Matrix Indicator (PMI), and Channel Quality Information (CQI) measurements, system information reading, etc. The measurements may be absolute or relative (e.g., absolute RSRP and relative RSRP). The measurements may be performed for one or more different purpose, e.g., Radio Resource Management (RRM), Self-Optimized Network (SON), positioning, MDT, etc. The measurements may be, e.g., intra-frequency measurements, inter-frequency measurements, inter-RAT measurements, or CA measurements. The measurements may be performed in the licensed and/or unlicensed spectrum.

The term time resource used herein may correspond to any type of physical resource or radio resource expressed in terms of length of time. Examples of time resources are: symbol, time slot, subframe, radio frame, Transmission Time Interval (TTI), interleaving time, hyper System Frame Number (H-SFN), etc.

In some embodiments, a term bandwidth (BW) is used. Over the BW the network node transmits to and/or receives signal from one or more UEs in a cell. The bandwidth is interchangeably referred to as operating BW, channel bandwidth, system bandwidth, transmission bandwidth, cell bandwidth, cell transmission BW, carrier bandwidth, measurement bandwidth, maximum allowed measurement bandwidth, common bandwidth of plurality of cells on a carrier etc. The BW may also correspond to BW of specific signals (e.g., BW of any of: Sounding Reference Signal (SRS), CRS, Demodulation Reference Signal (DMRS), synchronization signal, data channel, control channel, etc.). The BW may be expressed in different units. Examples of units are KHz, MHz, number of resource blocks, number of resource elements, number of subcarriers, number of physical channels, number of frequency resource units etc. The frequency channel or carrier frequency over which a Radio Access Technology (RAT) operates is enumerated or addressed by a channel number a.k.a. absolute radio frequency channel number (ARFCN), such as, for example, Evolved Universal Terrestrial Radio Access (E-UTRA) ARFCN (EARFCN) in LTE, etc. In cases where a signal is transmitted in a number of discontinuous in frequency RBs, the term bandwidth may also comprise the total span of all RBs of the signal.

The embodiments described herein may apply to any RAT or their evolution, e.g., LTE FDD, LTE TDD, UTRA, Global System for Mobile Communication (GSM), WiFi, short-range communication RAT, narrow band RAT, RAT for 5G, etc.

The terms "optional" and "in some embodiments" are both used to reflect optional, alternative features of various embodiments of aspect of the present disclosure.

Figure 3:
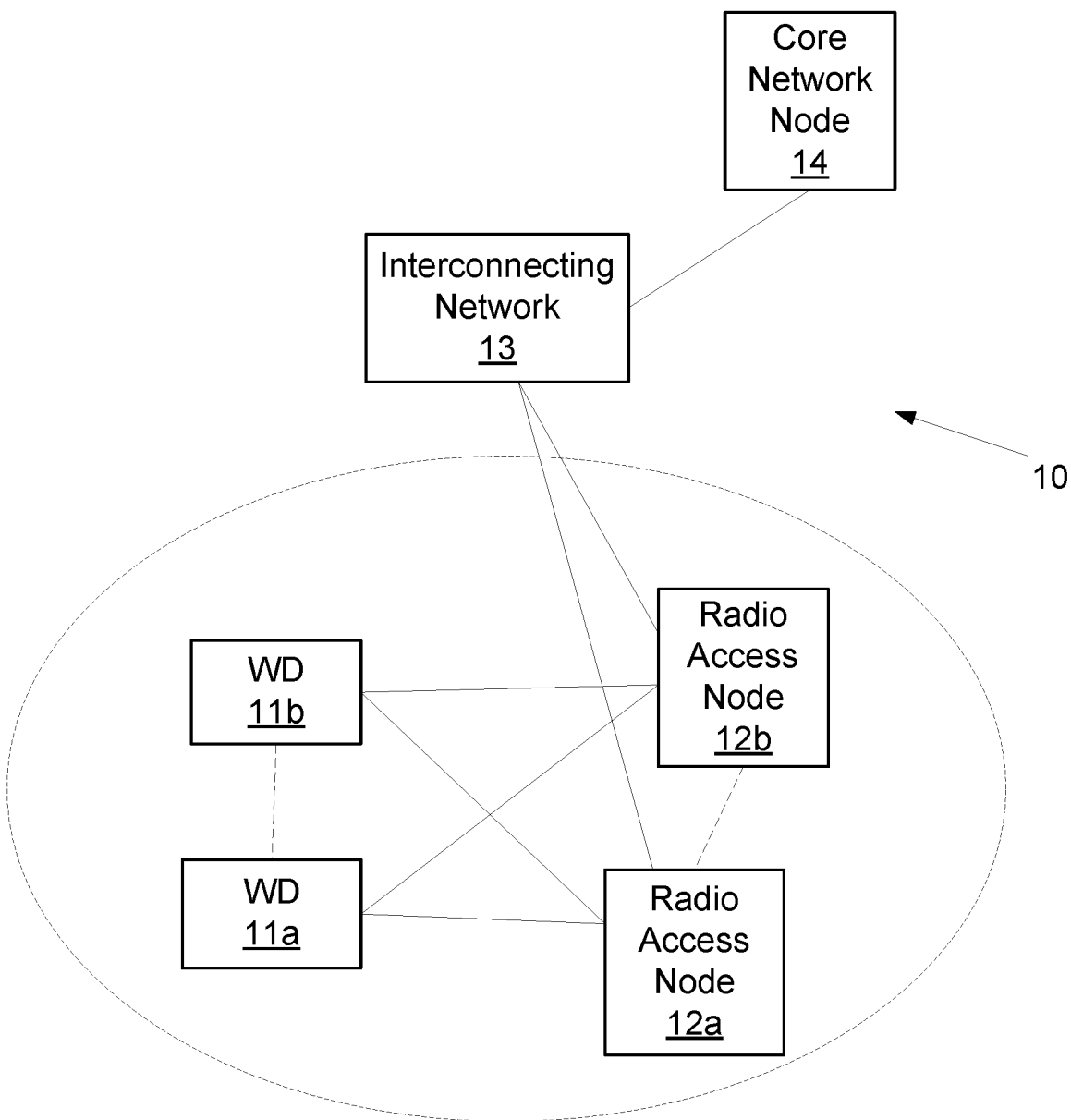
FIG. 3 illustrates an example of a wireless network that may be used for wireless communications according to embodiments of the present disclosure.

Referring now to the drawing figures in which like reference designators refer to like elements, FIG. 3 illustrates an example of a wireless network 10 that may be used for wireless communications according to the principles in the present disclosure. Wireless network 10 includes wireless devices 11a-11b (e.g., user equipment's, UEs) (referred to collectively as wireless device(s) 11 or WD(s) 11) and a plurality of radio access nodes 12a-12b (e.g., eNBs, gNBs, etc.) (referred to collective as radio access node(s) 12) connected to one or more core network nodes 14 via an interconnecting network 13. The network may use any suitable deployment scenarios, such as the non-centralized, co-sited, centralized, or shared deployment scenarios. Wireless devices 11 within a coverage area may each be capable of communicating directly with radio access nodes 12 over a wireless interface. In certain embodiments, wireless devices may also be capable of communicating with each other via device-to-device (D2D) communication. In certain embodiments, radio access nodes 12 may also be capable of communicating with each other, e.g. via an interface (e.g. X2 in LTE or other suitable means or interface or communication protocol).

As an example, wireless device 11a may communicate with radio access node 12a over a wireless interface. That is, wireless device 11a may transmit wireless signals and/or receive wireless signals from radio access node 12a. The wireless signals may contain voice traffic, data traffic, control signals, and/or any other suitable information. In some embodiments, an area of wireless signal coverage associated with a radio access node 12 may be referred to as a cell.

In some embodiments, wireless device 11 may be interchangeably referred to by the non-limiting term user equipment (UE). Wireless device 11 can be any type of wireless device capable of communicating with network node or another UE over radio signals. The UE may also be radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc. Example embodiments of wireless device 11 are described in more detail below with respect to FIGS. 5 and 7.

In some embodiments, generic terminology "network node" is used. It can be any kind of network node which may comprise of a radio network node such as radio access node 12 (which can include a base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU), Remote Radio Head (RRH), a multi-standard BS (also known as MSR BS), etc.), a core network node (e.g., MME, SON node, a coordinating node, positioning node, MDT node, etc.), or even an external node (e.g., 3rd party node, a node external to the current network), etc. The network node may also comprise test equipment. Example embodiments of radio access node 12 are described in more detail below with respect to FIGS. 4 and 6.

The term "radio node" may be used to denote a UE (e.g., wireless device 11) or a radio network node (e.g., radio access node 12).

Figure 4:
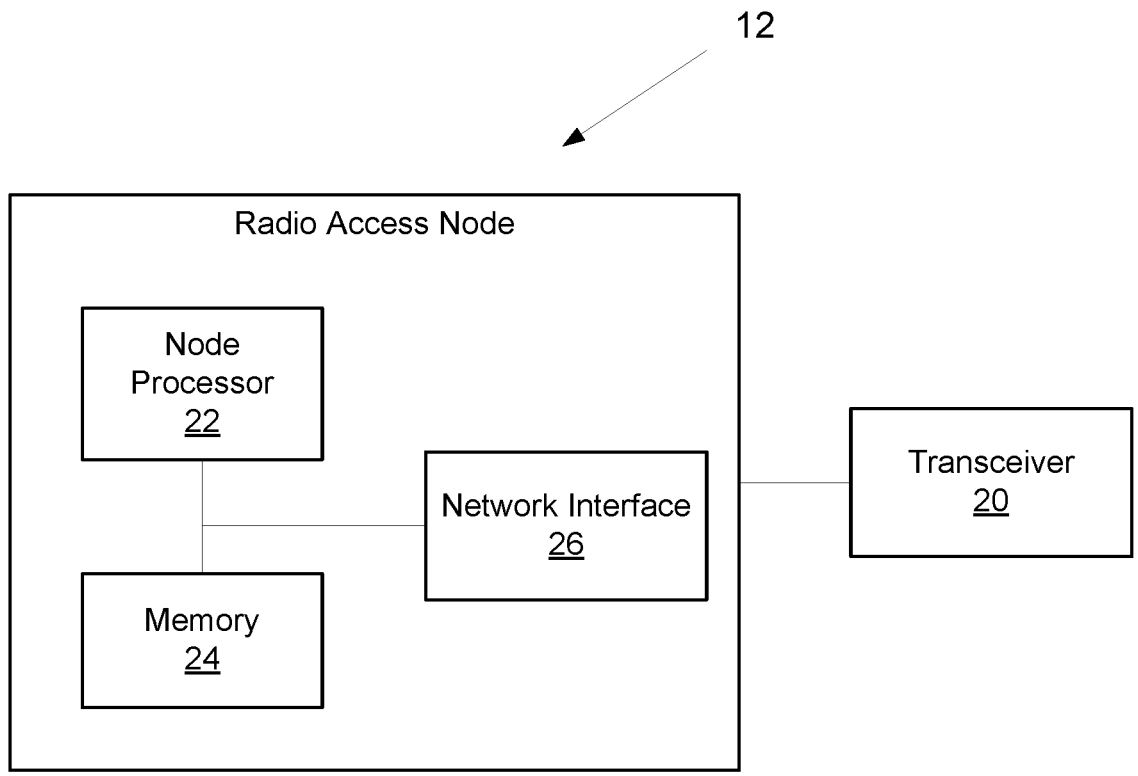
FIG. 4 is a block diagram of an exemplary radio access node according to embodiments of the present disclosure.

FIG. 4 is a block diagram of an exemplary radio access node 12, in accordance with certain embodiments. Radio access node 12 includes circuitry. The circuitry may include one or more of a transceiver 20, one or more processors 22, memory 24, and network interface 26. In some embodiments, the transceiver 20 facilitates transmitting wireless signals to and receiving wireless signals from wireless device 11 (e.g., via an antenna), the one or more processors 22 execute instructions to provide some or all of the functionalities described herein as being provided by a radio access node 12, the memory 24 stores the instructions for execution by the one or more processors 22, and the network interface 26 communicates signals to backend network components, such as a gateway, switch, router, Internet, Public Switched Telephone Network (PSTN), core network nodes or radio network controllers, etc.

The one or more processors 22 may include any suitable combination of hardware and software implemented in one or more modules to execute instructions and manipulate data to perform some or all of the described functions of radio access node 12, such as those described herein. In some embodiments, the one or more processors 22 may include, for example, one or more computers, one or more central processing units (CPUs), one or more microprocessors, one or more applications, one or more application specific integrated circuits (ASICs), one or more field programmable gate arrays (FPGAs) and/or other logic. In certain embodiments, the one or more processors 22 may comprise one or more of the modules discussed below with respect to FIGS. 6 and 7.

The memory 24 is generally operable to store instructions, such as a computer program, software, an application including one or more of logic, rules, algorithms, code, tables, etc. and/or other instructions capable of being executed by one or more processors 22. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 26 is communicatively coupled to the processor 22 and may refer to any suitable device operable to receive input for radio access node 12, send output from radio access node 12, perform suitable processing of the input or output or both, communicate to other devices, or any combination of the preceding. The network interface 26 may include appropriate hardware (e.g., port, modem, network interface card, etc.) and software, including protocol conversion and data processing capabilities, to communicate through a network.

Other embodiments of radio access node 12 may include additional components beyond those shown in FIG. 4 that may be responsible for providing certain aspects of the radio network node's functionality, including any of the functionality described herein and/or any additional functionality (including any functionality necessary to support the solutions described herein). The various different types of network nodes may include components having the same physical hardware but configured (e.g., via programming) to support different radio access technologies, or may represent partly or entirely different physical components.

Figure 5:
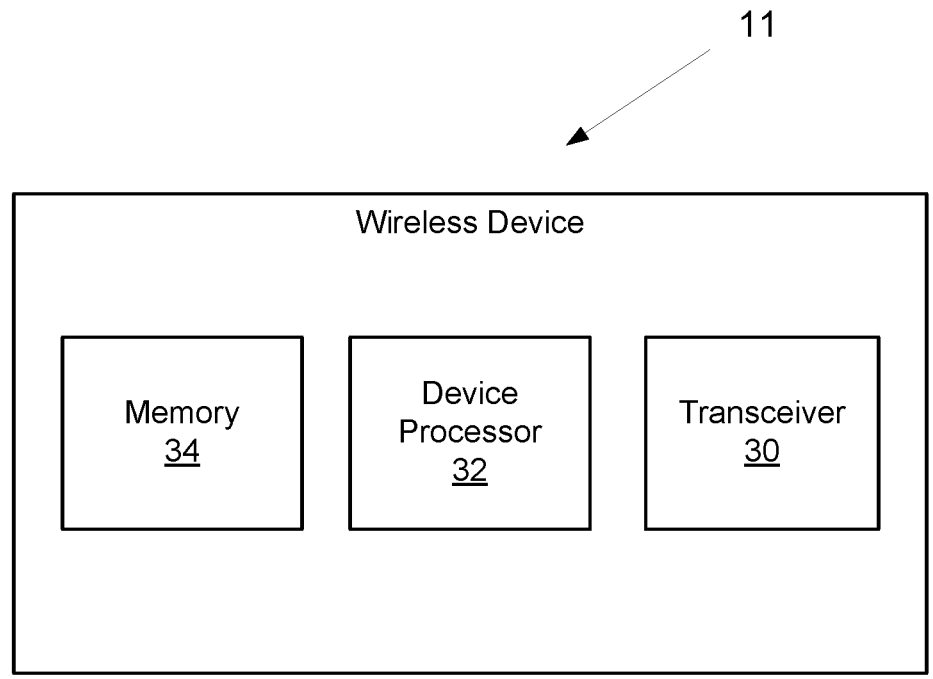
FIG. 5 is a block diagram of an exemplary wireless device according to embodiments of the present disclosure.

FIG. 5 is a block diagram of an exemplary wireless device 11, in accordance with certain embodiments. Wireless device 11 includes circuitry. The circuitry includes a transceiver 30, one or more processors 32 (only one shown), and memory 34. In some embodiments, the transceiver 30 facilitates transmitting wireless signals to and receiving wireless signals from radio access node 12 (e.g., via an antenna), the one or more processors execute instructions to provide some or all of the functionalities described herein as being provided by wireless device 11, and the memory 34 stores the instructions for execution by the one or more processors 32.

The processor 32 may include any suitable combination of hardware and software implemented in one or more modules to execute instructions and manipulate data to perform some or all of the described functions of wireless device 11, such as the functions of wireless device 11 described herein below. In some embodiments, the processor 32 may include, for example, one or more computers, one or more central processing units (CPUs), one or more microprocessors, one or more applications, one or more application specific integrated circuits (ASICs), one or more field programmable gate arrays (FPGAs) and/or other logic. In certain embodiments, the processor 32 may comprise one or more of the modules discussed below with respect to FIGS. 6 and 7.

The memory 34 is generally operable to store instructions, such as a computer program, software, an application including one or more of logic, rules, algorithms, code, tables, etc. and/or other instructions capable of being executed by one or more processors 32. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 32 of wireless device 11.

Other embodiments of wireless device 11 may include additional components beyond those shown in FIG. 5 that may be responsible for providing certain aspects of the wireless device's functionality, including any of the functionality described herein and/or any additional functionality (including any functionality necessary to support the solution described herein). As just one example, wireless device 11 may include input devices and circuits, output devices, and one or more synchronization units or circuits, which may be part of the one or more processors 32. Input devices include mechanisms for entry of data into wireless device 11. For example, input devices may include input mechanisms, such as a microphone, input elements, a display, etc. Output devices may include mechanisms for outputting data in audio, video and/or hard copy format. For example, output devices may include a speaker, a display, etc.

Processors, interfaces, and memory similar to those described with respect to FIGS. 4 and 5 may be included in other network nodes (such as core network node 14). Other network nodes may optionally include or not include a wireless interface (such as the transceivers 20 and 30 described in FIGS. 4 and 5). Functionalities described may reside within the same radio node and networks node or may be distributed across a plurality of radios nodes and network nodes.

Figure 6:
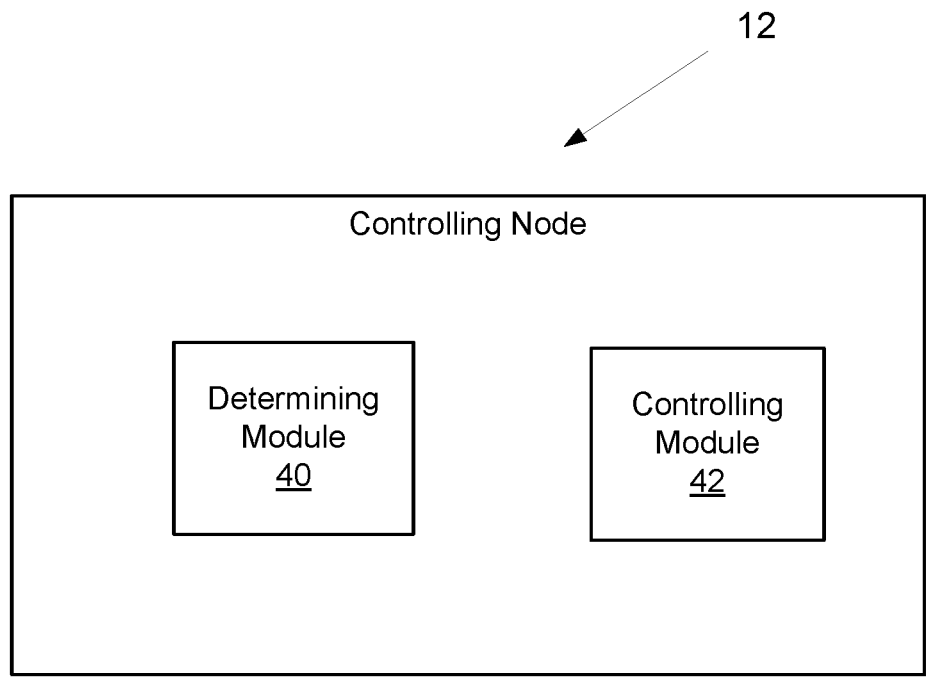
FIG. 6 is a block diagram of an alternative radio access node according to embodiments of the present disclosure.

FIG. 6 illustrates an example of a controlling node (e.g., radio access node 12), in accordance with certain embodiments. For clarity, the controlling node is indicated as 12; although it should be understood that some embodiments of the controlling node may be configured differently or have different or additional components than those depicted in the exemplary radio access node 12 shown in FIG. 4. The controlling node 12 may include a determining module 40 and a controlling module 42.

In certain embodiments, the determining module 40 may perform a combination of steps that may include steps such as Steps 1 and 2 summarized herein above and described in more detail herein below with reference to FIG. 8.

In certain embodiments, the controlling module 42 may perform a combination of steps that may include steps such as Step 3 and 4 summarized herein above and described in more detail herein below with reference to FIG. 8.

In certain embodiments, the modules in FIG. 6 may be implemented using one or more processors, such as the one or more processors 22 and/or 32 described with respect to FIG. 4 or 5. The modules may be integrated or separated in any manner suitable for performing the described functionality.

Figure 7:
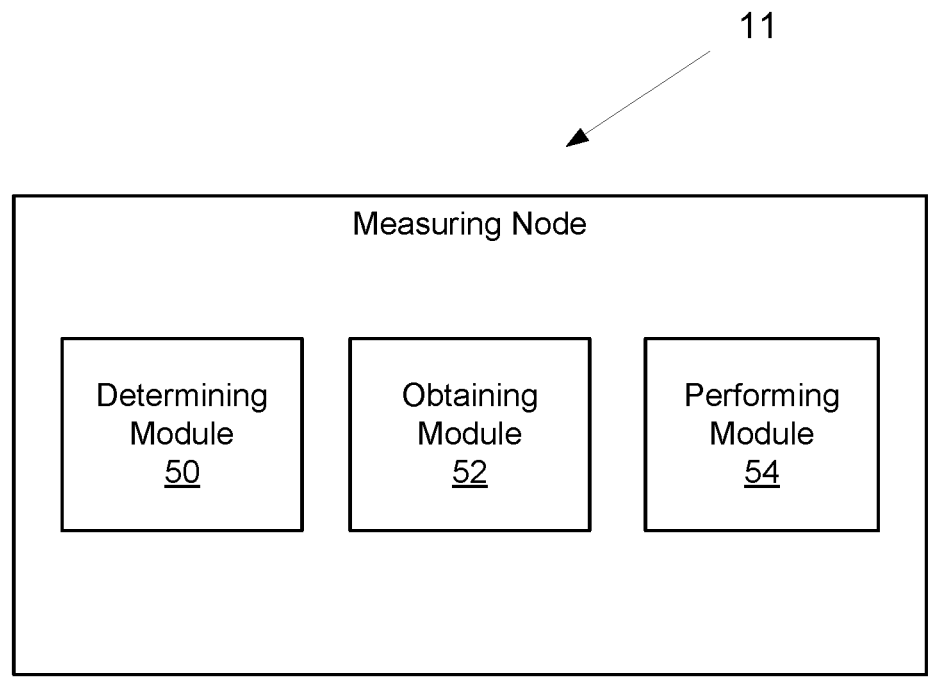
FIG. 7 is a block diagram of an alternative wireless device according to embodiments of the present disclosure.

FIG. 7 illustrates an example of a measuring node (e.g., wireless device 11) or other radio node, in accordance with certain embodiments. For clarity, the measuring node is indicated as 11; although it should be understood that some embodiments of the measuring node may be configured differently or have different or additional components than those depicted in the exemplary wireless device 11 shown in FIG. 4. The measuring node 11 may include a determining module 50, an obtaining module 52, and a performing module 54.

In certain embodiments, the determining module 50 may perform a combination of steps that may include steps such as Step 5 summarized herein above and described in more detail herein below with reference to FIG. 9.

In certain embodiments, the obtaining module 52 may perform a combination of steps that may include steps such as Step 6 summarized herein above and described in more detail herein below with reference to FIG. 9.

In certain embodiments, the performing module 54 may perform a combination of steps that may include steps such as Steps 7 and 8 summarized herein above and described in more detail herein below with reference to FIG. 9.

In certain embodiments, the modules may be implemented using one or more processors, such as the one or more processors 22 and/or 32 described with respect to FIG. 4 or 5. The modules may be integrated or separated in any manner suitable for performing the described functionality.

Having generally described some embodiments of the present disclosure, a more detailed description of embodiments associated with methods for a controlling node 12 according to a first aspect of the present disclosure will now be described.

Figure 8:
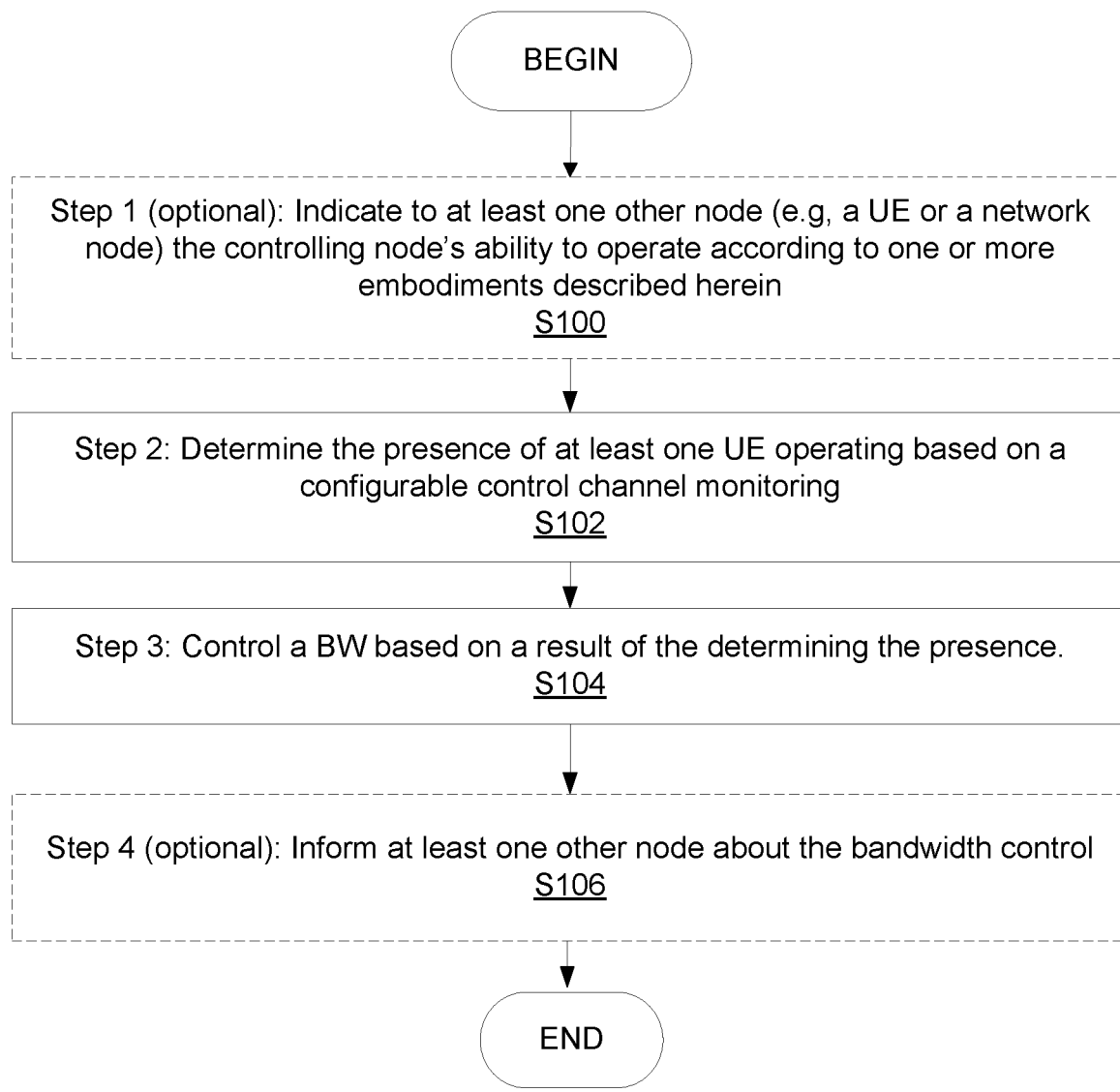
FIG. 8 is a flowchart illustrating an exemplary method for a controlling node according to embodiments of the present disclosure.

Examples of embodiments of methods for a controlling node 12 (e.g., a radio network node, a core network node, BS, radio network controller, SON node, O&M node, MME, etc.) according to certain embodiments of a first aspect of the present disclosure are illustrated in FIG. 8.

Referring now primarily to FIG. 8, examples of embodiments of such methods may comprise:

Step 1 (optional): Indicating to at least one other node (e.g., UE 11 or a network node) the controlling node's 12 ability to operate according to one or more embodiments described herein (block S100);

Step 2: Determining the presence in an area of at least one UE 11 which may be operating based on a configurable control channel monitoring (block S102); optionally, the determining may further comprise determining of at least one parameter characterizing configuration control channel monitoring of the at least one UE Step 3: Controlling a BW based on a result of the determining (block S104); optionally, the controlling may further comprise determining a subset of time resources over which the BW will be adapted based on a result of the determining;

optionally, the controlling may further comprise controlling of the time resources associated with configurable control channel monitoring for the at least one UE 11; and Step 4 (optional): Informing at least one other node (e.g., UE 11 or another network node) about the bandwidth control (block S106).

Additional details on the above steps, according to various embodiments are presented as follows.

Step 1

In this step, the controlling node 12 may indicate to at least one other node (e.g., UE 11 or a network node) the controlling node's 12 ability to operate according to one or more embodiments described herein (block S100).

In one example, the controlling node's 12 capability may be comprised in a more general capability, e.g., the controlling node's 12 ability to use a smaller CRS bandwidth than a system bandwidth.

In one further example, the indication may comprise an indication of the controlling node's 12 ability to control a second bandwidth configuration (e.g., transmission bandwidth for CRS). The controlling may also be performed so that it is possible for UEs 11 operating on such carriers to meet one or more performance requirements or targets.

The indication may be via a radio interface or a fixed interface (e.g., X2). The indication may be via higher-layer signaling (e.g., RRC or system information) and/or physical layer signaling (e.g., PDCCH). The indication may be via a dedicated channel, multi-cast, or broadcast.

The indication may be sent upon a request from another node or in an unsolicited way, such as, for example, upon a triggering condition or event.

The indication may also be indicative of one or more bandwidth configurations, which may be possible to select from for the second bandwidth configuration.

The indication may also be indicative of time and/or frequency resources associated with the second bandwidth configuration.

Step 2

In this step, the controlling node 12 may determine the presence in an area of at least one UE 11, which may be operating based on a configurable control channel monitoring (block S104). In one embodiment, the controlling node 12 may determine the presence in an area of at least N UEs 11, which may be operating based on a configurable control channel monitoring. The number, N, of UEs 11 that may be operating based on a configurable control channel monitoring may be any number, such as, for example, N=1, 2, . . . .

In some embodiments, N may be pre-defined or configurable.

In one example, the at least N UEs 11 may be low-complexity UEs, such as, for example, MTC UE, eMTC UE, or FeMTC UE.

A control channel may be PDCCH, NPDCCH, Enhanced PDCCH (E-PDCCH), or MPDCCH.

An area may be a logical or a physical area, e.g., a cell, a coverage area, an area characterized by specific signal conditions (e.g., RSRP and/or RSRQ with respect to a threshold), MBSFN area, tracking area, a building, etc.

The determining step may further comprise determining of a coverage level of the at least one UE 11.

In some embodiments, the determining may further comprise determining of at least one parameter characterizing configuration control channel monitoring of the at least one UE 11. Examples of the at least one parameter may include: r1, r2, r3, r4, $r_{max}$, parameter G, an offset for MPDCCH monitoring windows with respect to a reference (e.g., a reference SFN such as SFN0), etc.

In a further embodiment, the determining of the at least one parameter may be performed (or not performed) depending on the coverage level. In one specific example, no determining of the at least one parameter may be performed when the coverage level is above a threshold, or the UE 11 is operating in good conditions and therefore does not need the configurable control channel monitoring.

The determining of the presence of at least one UE 11 may be based on, for example, one or more of:

Indication or message received by, for example, the controlling node 12 from the at least one UE 11;

Indication or message received by, for example, the controlling node 12 from another node (e.g., a BS serving the UE 11, or a neighbor BS);

Control channel monitoring configuration (e.g., whether any UE 11 has been recently configured with control channel monitoring, such as, for example, a received parameter G);

UE 11 measurements;

Observing UE 11 behavior, e.g., UE 11 reporting periodicity, or UE measurement reporting;

Determining of a coverage level of a UE 11;

Determining that the coverage level of a UE 11 is below a threshold;

History of UE 11 operation; and/or

UE 11 capability information.

Step 3

In this step, the controlling node 12 may control a BW based on a result of the determining from Step 2 (block S104).

In one example, the BW may be a transmission BW of one or more signals/channel, such as, for example, a CRS bandwidth.

The controlling of the BW may further comprise determining BW configuration and/or configuring BW, such as, for example, a CRS bandwidth.

The controlling may be based, for example, on:
a pre-defined rule or a pre-defined function; and/or
selecting a value from a set of pre-defined values or a pre-defined table of values.

In another example, the controlling by the controlling node 12 may include using a first bandwidth, e.g., BW1, in some scenarios, and/or a second bandwidth, e.g., BW2, in other scenarios. For example, BW2 may be used if the presence of the at least N UEs using configurable control channel monitoring has been determined, otherwise BW1 may be used. BW2 may be in all or a subset of time resources on the corresponding carrier frequency. BW2 may be larger than BW1. BW1 may be 0 (i.e., no transmissions) or larger. In another example, BW1 is the smallest possible BW in a cell, e.g., 6 RBs.

In some embodiments, BW2 value and/or BW1 value may be pre-defined values, or may be determined based on a pre-defined rule, or may be received from another network node.

In a further embodiment, the controlling may further comprise determining a subset of time resources over which the BW will be adapted.

In one example, BW2 may be used in time resources S2 and BW1 may be used in time resources S1, wherein a control channel monitoring or associated operation (timing update or timing acquisition in relation to control channel monitoring) occurs in time resource S2, while no such operations occur in time resource S1 (S1 and S2 may or may not comprise all DL resources for the cell or for the UE 11). BW2 may be larger than BW1. In one example, BW2 may be a system bandwidth or the maximum transmission bandwidth on the carrier frequency or full bandwidth, while BW1 may be 0 (e.g., no CRS transmission if BW1 is configured as the CRS transmission BW) or BW1 may be 6 RBs or 1.4 MHz or a smallest possible BW selectable for the signal/channel transmission. In another example, S2 may comprise time resources configured for MPDCCH monitoring and/or adjacent/preceding/succeeding resources (e.g., K preceding subframes and/or M succeeding subframes).

In another example, BW2 may be used in time resources S2' which may be a superset (joining) of all S2 resources of individual UEs 11; otherwise BW1 may be used.

In a further embodiment, to increase the power efficiency, the set of resources S2 and/or S2' may be minimized. In some such examples, this optimization may be performed only when BW2>threshold, or abs (BW2−BW1)>threshold, such as, for example, when some significant resource saving from such optimization is expected.

In another example, one or more rules may be defined to ensure the necessary CRS transmission configuration during the control channel monitoring and, based on which, the measuring node 11 (e.g., UE 11) may assume that:
In a cell during radio resources when control channel monitoring is configured, the CRS are available over the entire bandwidth of the cell regardless of the CRS BW in other radio resources of that cell; or
In a cell during radio resources when control channel monitoring is configured, the CRS are available over bandwidth larger than BW threshold (Bt) regardless of the CRS BW in other radio resources of that cell. Examples of Bt are 6 RBs, X % of cell BW, etc.

The measuring node 11 may meet one or more requirements (e.g., reception quality of the control channel, measurement period, etc.) related to the control channel monitoring provided that any of the rule(s) are applied by the radio node (e.g., 12) transmitting the CRS signals. Hence, the controlling node 12 and/or the transmitting nodes should preferably ensure the corresponding CRS transmissions.

In another example, BW2 may depend on one or more parameters associated with the control channel monitoring configuration, such as, for example, at least on parameter G. For example, BW2 may be based on parameter G, as follows: BW2=f(G, . . . ).

In yet another example, BW2 may depend at least on parameter, $r_{max}$, as follows: BW2=f($r_{max}$, . . . ). For example, if $r_{max}$ is larger than a threshold number of repetitions (Rt) then BW2 is equal to or smaller than BW threshold (Bt); otherwise if $r_{max}$ is not larger than Rt then BW2 is larger than Bt. Examples of Rt and Bt are 32 and 6 RBs, respectively. In another example, if $r_{max}$ is larger than Rt then BW2<6 RBs; otherwise if $r_{max}$<Rt then BW2=full BW of the cell.

In yet another example, BW2 may depend at least on G and $r_{max}$ as follows: BW2=f(G, $r_{max}$). For example, if $r_{max}$ is larger than a threshold (Rt) and G is smaller than a threshold (Gt) then BW2 is equal to or smaller than BW threshold (Bt); otherwise if $r_{max}$ is not larger than Rt and G is not larger then Gt then BW2 is larger than Bt.

In another embodiment, the controlling may further comprise controlling of the time resources S2 and/or S2' associated with configurable control channel monitoring for the at least one UE 11, which may further comprise, for example, any one or more of:
Increasing G (i.e., less frequent control channel monitoring but also less frequent CRS transmission over a large BW) for one or more UEs 11;
Using a common G parameter for all or most UEs 11;
Using common resources for control channel monitoring by all or most of the UEs 11;
Aligning in time of the control channel monitoring windows for multiple UEs 11 receiving the same RSs, e.g., served by the same cell. In one example, the same G and the same offset may be used for all or most or at least N UEs 11;
Avoiding using a random start of the control channel monitoring windows for different UEs (which may be difficult to align);
Aligning control channel monitoring windows with DRX ON (active UE state configured by means of network-configured DRX) for which full-bandwidth CRS may be provided anyway; and/or
Moving one or more UEs 11 which need configurable control channel monitoring to another carrier.

The controlling of the bandwidth may further comprise configuring the bandwidth, BW2, of one or more signals in all or a subset of resources.

The controlling of the bandwidth may further comprise sending a command (to other layers or to other nodes such as nodes transmitting the relevant signals/channels) to increase/decrease the bandwidth and/or sending the new bandwidth configuration. In some examples, the controlling node 12 may not itself transmit the signal(s) whose BW is controlled by embodiments of the present disclosure, such as, for example, a reference signal (e.g., CRS).

Step 4

In this step, the controlling node 12 may inform at least one other node (e.g., UE 11 or another network node) about the bandwidth control (block S106).

The informing may comprise, for example, informing the at least one other node that the bandwidth has been (or will be) changed and/or sending the new bandwidth BW2.

The informing may also happen selectively, e.g., upon a request from another node, upon a condition, or upon changing the bandwidth of a second type of reference signal.

The informing may also comprise triggering one or more corresponding actions (e.g., configure measurement configuration or receiver accordingly, configure transmission configuration of a type of reference signal accordingly, adapting measurement bandwidth, etc.) in the receiving node (e.g., UE 11).

The informing may be via radio or other interface, via higher-layer signaling, or physical layer signaling (e.g., control channel), via unicast/multicast/broadcast, etc.

Having described some embodiments for a controlling node 12, a more detailed description of embodiments associated with methods for a measuring node 11 according to a second aspect of the present disclosure will be described.

Figure 9:
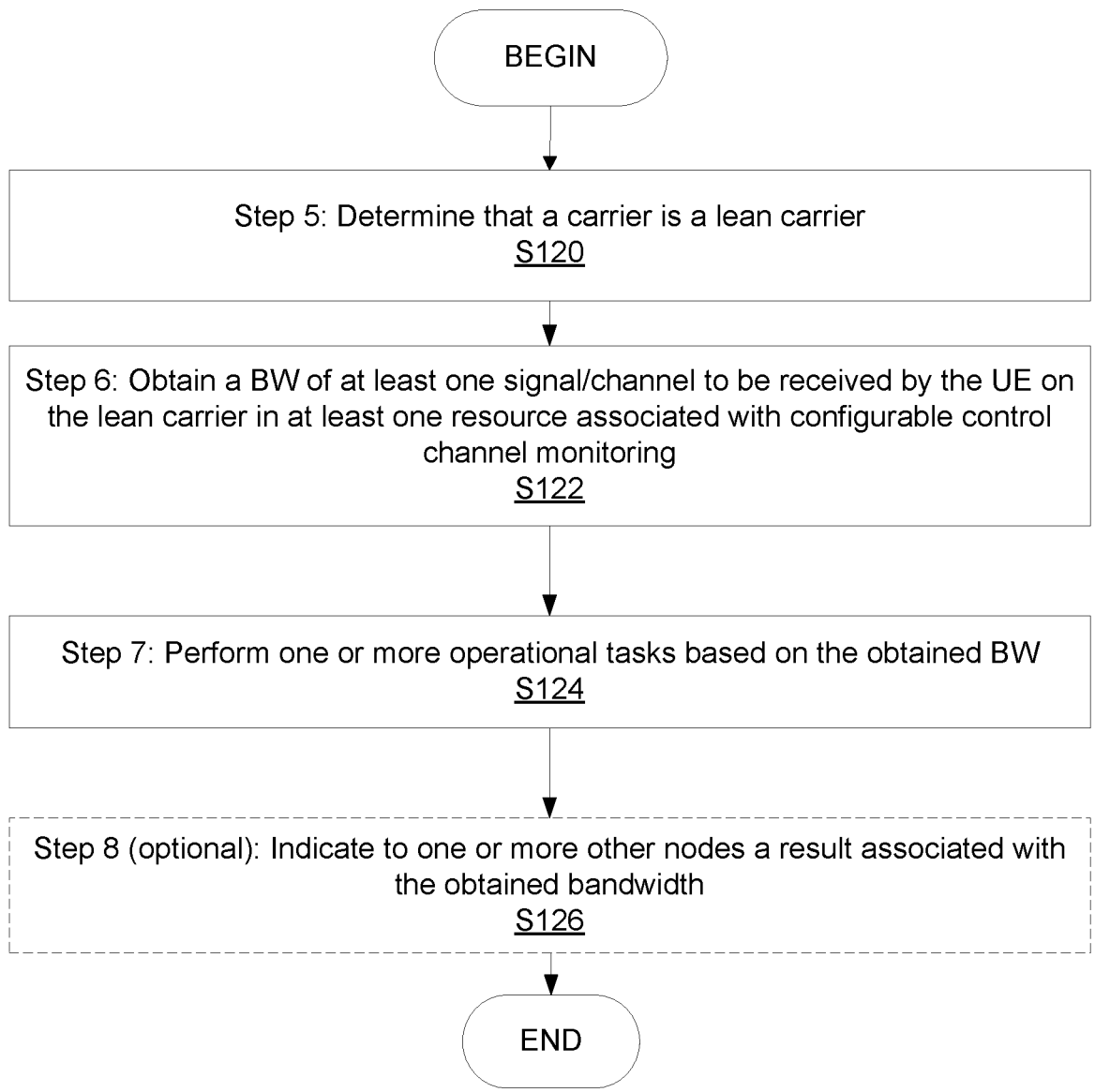
FIG. 9 is a flowchart illustrating an exemplary method for a measuring node according to embodiments of the present disclosure.

Examples of embodiments of methods for a measuring node 11 (e.g., UE 11 or a radio network node, etc.) according to certain embodiments of a second aspect of the disclosure are illustrated in FIG. 9.

Referring now primarily to FIG. 9, examples of embodiments of such methods may comprise the following steps (see also corresponding embodiments of methods for a controlling node 12):

Step 5: Determining that a carrier is a lean carrier (block S120);

Step 6: Obtaining a bandwidth of at least one signal/channel to be received by the UE 11 on the lean carrier in resources associated with configurable control channel monitoring (block S122);

Step 7: Performing one or more operational tasks, based on the obtained bandwidth (block S124); and Step 8 (optional): Indicating to one or more other nodes a result associated with the obtained bandwidth (block S126).

Additional details on the above steps, according to various embodiments are presented next.

Step 5

In this step, the measuring node 11 may determine that a carrier is a lean carrier (block S120).

For example, a carrier may be a lean carrier when CRS bandwidth may be smaller than the full bandwidth of a cell, at least in some resources.

The determining may be based, for example, on one or more of:
  Measurements performed by the measuring node 11;
  Blind detection of presence of some signals (e.g., CRS);
  Evaluating two or more bandwidth hypotheses for the same type of signal/channel; and/or
  Indication or message received from another node (another UE 11 or network node, serving BS, positioning node, etc.) via unicast/multicast/broadcast.

Step 6

In this step, the measuring node 11 may obtain the bandwidth of at least one signal/channel to be received by the UE 11 on the lean carrier in resources associated with configurable control channel monitoring (block S122), such as, for example, CRS bandwidth in resources configured for MPDCCH monitoring and/or adjacent resources (e.g., K preceding subframes and/or M succeeding subframes).

The obtaining of the bandwidth may further comprise obtaining of time resources in which the obtained bandwidth would apply. The resources may be indicated by another node or may be determined based on the control channel monitoring configuration (e.g., G, $r_{max}$, offset, etc., or any other parameter associated with the configurable control channel monitoring, such as those discussed herein above).

The obtaining may be based, for example, on one or more of:
  a pre-defined rule or requirement;
  a mapping table;
  a pre-defined value;
  selecting a value from a set of or a table with pre-defined values;
  instructions received in a message from another node such as the controlling node 12 (e.g., BS or positioning node); and/or
  assumption(s) about the controlling node's 12 behavior (with respect to the transmission bandwidth configuration of the signal/channel of interest), e.g., based on one or more embodiments described in connection with methods for a controlling node 12, according to a first aspect of the disclosure.

Step 7

In this step, the measuring node 11 may perform one or more operational tasks, based on the obtained bandwidth (block S124).

Examples of the operational tasks include without limitation:
  Radio measurements (such as those described herein above, for example);
  Time and/or frequency tracking or timing acquisition; and
  Control channel demodulation and/or decoding.

Step 8

In this step, the measuring node 11 may indicate to one or more other nodes such as the controlling node 12 (e.g., serving BS, positioning node, another UE 11, etc.) a result associated with the obtained bandwidth (block S126). In one example, the bandwidth may be comprised in a measurement report or operational task report.

The indication may be upon a request, or in an unsolicited way, or in conjunction with reporting a result of the one or more operational tasks (e.g., together with measurement reporting).

According to one aspect of the present disclosure, a method for a controlling node 12a is provided that includes determining a presence of at least one user equipment 11 operating based on a configurable control channel monitoring (block S102); and controlling a bandwidth based on the determining the presence of the at least one user equipment 11 operating based on the configurable control channel monitoring (block S104).

According to this aspect of the present disclosure, in some embodiments, determining the presence of the at least one user equipment 11 operating based on the configurable control channel monitoring comprises determining at least one parameter at least partially characterizing the configurable control channel monitoring of the at least one user equipment 11. In some embodiments, the at least one parameter at least partially characterizing the configurable control channel monitoring of the at least one user equipment 11 includes at least one of a parameter G and $r_{max}$, $r_{max}$ representing a maximum number of repetitions associated with a control channel and G representing an indicator used for indicating control channel resources. In some embodiments, the at least one parameter at least partially characterizing the configurable control channel monitoring of the at least one user equipment 11 includes at least one of a repetition level of a set of repetition levels associated with a control channel and an offset for a Machine-Type Communication Downlink Control Channel (MPDCCH) monitoring window. In some embodiments, controlling the bandwidth based on determining the presence of the at least one user equipment 11 operating based on the configurable control channel monitoring comprises controlling the bandwidth of a cell-specific reference signal, CRS, based on determining the presence of the at least one user equipment 11 operating based on the configurable control channel monitoring. In some embodiments, controlling the bandwidth based on determining the presence of the at least one user equipment 11 operating based on the configurable control channel monitoring comprises using a first bandwidth value for a signal if the presence of the at least one user equipment 11 operating based on the configurable control channel monitoring is not detected and using a second bandwidth value for the signal if the presence of the at least one user equipment 11 operating based on the configurable control channel monitoring is detected, the second bandwidth value being different from the first bandwidth value. In some embodiments, the second bandwidth value is greater than the first bandwidth value. In some embodiments, determining the presence of the at least one user equipment 11 operating based on the configurable control channel monitoring comprises determining a number of user equipments 11 in an area operating based on the configurable control channel monitoring; and controlling the bandwidth based on determining the presence of the at least one user equipment 11 operating based on the configurable control channel monitoring comprises using a first bandwidth value if the number of user equipments 11 in the area operating based on the configurable control channel monitoring at least meets a pre-defined value and using a second bandwidth value if the number of user equipments 11 in the area operating based on the configurable control channel monitoring does not at least meet the pre-defined value, the second bandwidth value being different from the first bandwidth value. In some embodiments, controlling the bandwidth based on determining the presence of at least one user equipment 11 operating based on the configurable control channel monitoring comprises: determining a first subset of time resources and a second subset of time resources; and using a first bandwidth value for the first subset of time resources and a second bandwidth value for the second set of time resources, the second subset being different from the first subset and the second bandwidth value being different from the first bandwidth value. In some embodiments, the method further includes at least one of: indicating to at least one other node 11, 12b the controlling node's 12a ability to control the bandwidth based on determining the presence of the at least one user equipment 11 operating based on the configurable control channel monitoring (block S100); and informing at least one other node 11, 12b of the controlled bandwidth (block S106).

According to another aspect of the present disclosure, a method for a measuring node 11a includes obtaining a bandwidth of at least one signal in at least one resource associated with configurable control channel monitoring (block S122), the bandwidth being controlled based on a determined presence of at least one user equipment 11 operating based on the configurable control channel monitoring; and performing at least one operational task based on the obtained bandwidth (block S124).

According to this aspect of the present disclosure, in some embodiments, the determined presence of the at least one user equipment 11 operating based on the configurable control channel monitoring is determined by determining at least one parameter at least partially characterizing the configurable control channel monitoring. In some embodiments, the at least one parameter at least partially characterizing the configurable control channel monitoring of the at least one user equipment 11 includes at least one of: a parameter G, G representing an indicator used for indicating control channel resources; a parameter $r_{max}$, $r_{max}$ representing a maximum number of repetitions associated with a control channel; a repetition level of a set of repetition levels associated with a control channel; and an offset for a Machine-Type Communication Downlink Control Channel (MPDCCH) monitoring window. In some embodiments, the bandwidth of the at least one signal is a bandwidth of a cell-specific reference signal (CRS). In some embodiments, the obtained bandwidth of the at least one signal in the at least one resource associated with the configurable control channel monitoring is different from a second bandwidth of at least one other signal in at least one other resource that is not associated with the configurable control channel monitoring. In some embodiments, the bandwidth is further controlled based on whether a number of user equipments 11 operating based on the configurable control channel monitoring at least meets a pre-defined value. In some embodiments, obtaining the bandwidth of at least one signal in the at least one resource associated with the configurable control channel monitoring comprises obtaining at least one time resource in which the obtained bandwidth applies. In some embodiments, the method further comprising at least one of: determining that a carrier associated with the at least one signal is a lean carrier (block S120); and indicating to at least one other node 12, 11b a result of the obtaining the bandwidth. In some embodiments, performing the at least one operational task based on the obtained bandwidth comprises at least one of performing a radio measurement, a timing acquisition, a control channel demodulation, and a control channel decoding.

According to yet another aspect of the present disclosure, a controlling node 12a includes circuitry, the circuitry configured to: determine a presence of at least one user equipment 11 operating based on a configurable control channel monitoring; and control a bandwidth based on the determining the presence of the at least one user equipment 11 operating based on the configurable control channel monitoring.

According to this aspect of the present disclosure, in some embodiments, the circuitry is further configured to determine at least one parameter at least partially characterizing the configurable control channel monitoring of the at least one user equipment 11. In some embodiments, the at least one parameter at least partially characterizing the configurable control channel monitoring of the at least one user equipment 11 includes at least one of a parameter G and $r_{max}$, $r_{max}$ representing a maximum number of repetitions associated with a control channel and G representing an indicator used for indicating control channel resources. In some embodiments, the at least one parameter at least partially characterizing the configurable control channel monitoring of the at least one user equipment 11 includes at least one of a repetition level of a set of repetition levels associated with a control channel and an offset for a Machine-Type Communication Downlink Control Channel (MPDCCH) monitoring window. In some embodiments, the circuitry is further configured to control a bandwidth of a cell-specific reference signal (CRS) based on determining the presence of the at least one user equipment 11 operating based on the configurable control channel monitoring. In some embodiments, the circuitry is further configured to use a first bandwidth value for a signal if the presence of the at least one user equipment 11 operating based on the configurable control channel monitoring is not detected and using a second bandwidth value for the signal if the presence of the at least one user equipment 11 operating based on the configurable control channel monitoring is detected, the second bandwidth value being different from the first bandwidth value. In some embodiments, the second bandwidth value is greater than the first bandwidth value. In some embodiments, the circuitry is further configured to: determine a number of user equipments 11 in an area operating based on the configurable control channel monitoring; and use a first bandwidth value if the number of user equipments 11 in the area operating based on the configurable control channel monitoring at least meets a pre-defined value and using a second bandwidth value if the number of user equipments 11 in the area operating based on the configurable control channel monitoring does not at least meet the pre-defined value, the second bandwidth value being different from the first bandwidth value. In some embodiments, the circuitry is further configured to: determine a first subset of time resources and a second subset of time resources; and use a first bandwidth value for the first subset of time resources and a second bandwidth value for the second set of time resources, the second subset being different from the first subset and the second bandwidth value being different from the first bandwidth value. In some embodiments, the circuitry is further configured to at least one of: indicate to at least one other node 11, 12b the controlling node's 12a ability to control the bandwidth based on determining the presence of the at least one user equipment 11 operating based on the configurable control channel monitoring; and inform at least one other node 11, 12b of the controlled bandwidth.

According to another aspect of the present disclosure, a measuring node 11a includes circuitry, the circuitry configured to: obtain a bandwidth of at least one signal in at least one resource associated with configurable control channel monitoring, the bandwidth being controlled based on a determined presence of at least one user equipment 11 operating based on the configurable control channel monitoring; and perform at least one operational task based on the obtained bandwidth.

According to this aspect of the present disclosure, in some embodiments, the determined presence of the at least one user equipment 11 operating based on the configurable control channel monitoring is determined by determining at least one parameter at least partially characterizing the configurable control channel monitoring. In some embodiments, the at least one parameter at least partially characterizing the configurable control channel monitoring of the at least one user equipment 11 includes at least one of: a parameter G, G representing an indicator used for indicating control channel resources; a parameter and $r_{max}$, $r_{max}$ representing a maximum number of repetitions associated with a control channel; a repetition level of a set of repetition levels associated with a control channel; and an offset for a Machine-Type Communication Downlink Control Channel (MPDCCH) monitoring window. In some embodiments, the bandwidth of the at least one signal is a bandwidth of a cell-specific reference signal (CRS). In some embodiments, the obtained bandwidth of the at least one signal in the at least one resource associated with the configurable control channel monitoring is different from a second bandwidth of at least one other signal in at least one other resource that is not associated with the configurable control channel monitoring. In some embodiments, the bandwidth is further controlled based on whether a number of user equipments 11 in an area operating based on the configurable control channel monitoring at least meets a pre-defined value. In some embodiments, the circuitry is further configured to obtain at least one time resource in which the obtained bandwidth applies. In some embodiments, the circuitry is further configured to at least one of: determine that a carrier associated with the at least one signal is a lean carrier; and indicate to at least one other node 12, 11b a result of obtaining the bandwidth. In some embodiments, the circuitry is further configured to perform at least one operational task based on the obtained bandwidth by at least one of performing a radio measurement, a timing acquisition, a control channel demodulation, and a control channel decoding.

According to another aspect, a controlling node 12 includes a determining module 40 configured to determine a presence of at least one user equipment 11 operating based on a configurable control channel monitoring; and a controlling module 44 configured to control a bandwidth based on the determining the presence of at least one user equipment 11 operating based on a configurable control channel monitoring.

According to yet another aspect, a measuring node 11 includes an obtaining module 52 configured to obtain a bandwidth of at least one signal in at least one resource associated with configurable control channel monitoring, the bandwidth being controlled based on a determined presence of at least one user equipment 11 operating based on the configurable control channel monitoring; and a performing module 54 configured to perform at least one operational task based on the obtained bandwidth.

Any two or more embodiments described in this document may be combined in any way with each other. Furthermore, the described embodiments are not limited to the described radio access technologies (e.g., LTE, New Radio (NR)). That is, the described embodiments can be adapted to other radio access technologies.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order. In some embodiments, some steps may be performed concurrently with one another. In some embodiments, some steps listed as separate steps may be implementations of a separately listed step. In yet other embodiments, some steps described as an implementation of one step may in some embodiments be a separate step. Generally, all terms used in the disclosure are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

3GPP specifications, such as Rxxxx documents and TSxxx documents are publicly available at http://www.3gpp.org.

At least some of the following abbreviations may be used in this disclosure.

1×RTT CDMA2000 1× Radio Transmission Technology
3GPP Third Generation Partnership Project
ABS Almost Blank Subframe
ARQ Automatic Repeat Request
AWGN Additive White Gaussian Noise
BCCH Broadcast Control Channel
BCH Broadcast Channel
BS Base Station
BW Bandwidth
CA Carrier Aggregation
CC Carrier Component
CCCH SDU Common Control Channel SDU
CDMA Code Division Multiplexing Access
CGI Cell Global Identifier
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
CSI-RSRP Reference symbol received power using CSI reference symbols
DCCH Dedicated Control Channel
DL Downlink
DRS Discovery Signal
DRX Discontinuous Reception
DTX Discontinuous Transmission
DTCH Dedicated Traffic Channel
DUT Device Under Test
DwPTS Downlink Pilot Time Slot
E-CID Enhanced Cell-ID (positioning method)
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FDM Frequency Division Multiplexing
GERAN GSM EDGE Radio Access Network
gNB Next Generation eNB
GP Guard Period
GSM Global System for Mobile communication
HARQ Hybrid Automatic Repeat Request
HO Handover
HSPA High Speed Packet Access
HRPD High Rate Packet Data
ID Identifier
LAA License assisted access
LBT Listen before talk
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PUCCH Physical Uplink Control Channel
PUSCH Physical Uplink Shared Channel
RAT Radio Access Technology
RB Resource Block
RF Radio Frequency
RLM Radio Link Management
RRC Radio Resource Control
RSCP Received Signal Code Power
RSRP Reference Symbol Received Power
RSRQ Reference Symbol Received Quality
RSSI Received Signal Strength Indicator
RSTD Reference Signal Time Difference
RTT Round Trip Time
Rx Receive
QAM Quadrature Amplitude Modulation
RACH Random Access Channel
RAT Radio Access Technology
RNC Radio Network Controller
RNTI Radio Network Temporary Identifier
RRC Radio Resource Control
RRM Radio Resource Management
SCH Synchronization Channel
SCell Secondary Cell
SDU Service Data Unit
SFN System Frame Number
SGW Serving Gateway
SI System Information
SIB System Information Block
SINR Signal to Interference plus Noise Ratio
SNR Signal to Noise Ratio
SON Self Optimized Network
TDD Time Division Duplex
TA Timing Advance
TDM Time Division Multiplexing
TOA Time Of Arrival
TTI Transmission Time Interval
Tx Transmit
UE User Equipment
UL Uplink
UMTS Universal Mobile Telecommunication System
UpPTS Uplink Pilot Time Slot
UTRA Universal Terrestrial Radio Access
UTRAN Universal Terrestrial Radio Access Network
WCDMA Wide CDMA
WLAN Wide Local Area Network As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects, which may generally be referred to herein as a "circuit" or "module" in some embodiments. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for a controlling node, the method comprising:
   determining a presence of at least one user equipment operating based on a configurable control channel monitoring; and
   controlling a bandwidth of a cell-specific reference signal, CRS, based on the determining the presence of the at least one user equipment operating based on the configurable control channel monitoring, the controlling the bandwidth of the CRS comprising:
   determining a first subset of time resources and a second subset of time resources; and
   using a first CRS bandwidth value for the first subset of time resources and a second CRS bandwidth value for the second set of time resources, the second subset being different from the first subset and the second CRS bandwidth value being different from the first CRS bandwidth value.

2. The method according to claim 1, wherein the determining the presence of the at least one user equipment operating based on the configurable control channel monitoring comprises determining at least one parameter at least partially characterizing the configurable control channel monitoring of the at least one user equipment.

3. The method according to claim 2, wherein the at least one parameter at least partially characterizing the configurable control channel monitoring of the at least one user equipment includes at least one of a parameter G and $r_{max}$, $r_{max}$ representing a maximum number of repetitions associated with a control channel and G representing an indicator used for indicating control channel resources.

4. The method according to claim 2, wherein the at least one parameter at least partially characterizing the configurable control channel monitoring of the at least one user equipment includes at least one of a repetition level of a set of repetition levels associated with a control channel and an offset for a Machine-Type Communication Downlink Control Channel, MPDCCH, monitoring window.

5. The method according to claim 1, wherein controlling the bandwidth based on determining the presence of the at least one user equipment operating based on the configurable control channel monitoring comprises controlling the bandwidth of a cell-specific reference signal, CRS, based on determining the presence of the at least one user equipment operating based on the configurable control channel monitoring.

6. The method according to claim 1, wherein the controlling the bandwidth of the CRS based on the determining the presence of the at least one user equipment operating based on the configurable control channel monitoring comprises using the first CRS bandwidth value for the CRS if the presence of the at least one user equipment operating based on the configurable control channel monitoring is not detected and using the second bandwidth value for the CRS if the presence of the at least one user equipment operating based on the configurable control channel monitoring is detected.

7. The method according to claim 6, wherein the second CRS bandwidth value is greater than the first CRS bandwidth value.

8. The method according to claim 1, wherein:
the determining the presence of the at least one user equipment operating based on the configurable control channel monitoring comprises determining a number of user equipments in an area operating based on the configurable control channel monitoring; and
the controlling the bandwidth of the CRS based on the determining the presence of the at least one user equipment operating based on the configurable control channel monitoring comprises using the first CRS bandwidth value if the number of user equipments in the area operating based on the configurable control channel monitoring at least meets a pre-defined value and using the second CRS bandwidth value if the number of user equipments in the area operating based on the configurable control channel monitoring does not at least meet the pre-defined value.

9. The method according to claim 1, further comprising at least one of:
indicating to at least one other node the controlling node's ability to control the bandwidth of the CRS based on the determining the presence of the at least one user equipment operating based on the configurable control channel monitoring; and
informing at least one other node of the controlled bandwidth of the CRS.

10. A method for a measuring node, the method comprising:
obtaining a bandwidth of a cell-specific reference signal CRS, for at least one resource associated with configurable control channel monitoring, the bandwidth of the CRS being controlled based on:
a determined presence of at least one user equipment operating based on the configurable control channel monitoring; and
a determined first subset of time resources and a second subset of time resources in which a first CRS bandwidth value is used for the first subset of time resources and a second CRS bandwidth value is used for the second set of time resources, the second subset being different from the first subset and the second CRS bandwidth value being different from the first CRS bandwidth value; and
performing at least one operational task based on the obtained bandwidth.

11. The method according to claim 10, wherein the determined presence of the at least one user equipment operating based on the configurable control channel monitoring is determined by determining at least one parameter at least partially characterizing the configurable control channel monitoring.

12. The method according to claim 11, wherein the at least one parameter at least partially characterizing the configurable control channel monitoring of the at least one user equipment includes at least one of:
a parameter G, G representing an indicator used for indicating control channel resources;
a parameter $r_{max}$, $r_{max}$ representing a maximum number of repetitions associated with a control channel;
a repetition level of a set of repetition levels associated with a control channel; and
an offset for a Machine-Type Communication Downlink Control Channel, MPDCCH, monitoring window.

13. The method according to claim 10, wherein the obtained bandwidth of the CRS for the at least one resource associated with the configurable control channel monitoring is different from a second bandwidth a CRS for at least one other resource that is not associated with the configurable control channel monitoring.

14. The method according to claim 10, wherein the obtained bandwidth of the CRS is further controlled based on whether a number of user equipments operating based on the configurable control channel monitoring at least meets a pre-defined value.

15. The method according to claim 10, wherein obtaining the bandwidth of the CRS for the at least one resource associated with the configurable control channel monitoring comprises obtaining at least one time resource in which the obtained bandwidth applies.

16. The method according to claim 10, further comprising at least one of:
determining that a carrier associated with the bandwidth of the CRS is a lean carrier; and
indicating to at least one other node a result of the obtaining the bandwidth.

17. The method according to claim 10, wherein the performing the at least one operational task based on the obtained bandwidth of the CRS comprises at least one of performing a radio measurement, a timing acquisition, a control channel demodulation, and a control channel decoding.

18. A controlling node, the controlling node comprising:
circuitry, the circuitry configured to:
determine a presence of at least one user equipment operating based on a configurable control channel monitoring;
control a bandwidth of a cell-specific reference signal, CRS, based on the determining the presence of the at least one user equipment operating based on the configurable control channel monitoring; and
control the bandwidth of the CRS by being configured to:
determine a first subset of time resources and a second subset of time resources; and
use a first CRS bandwidth value for the first subset of time resources and a second CRS bandwidth value for the second set of time resources, the second subset being different from the first subset and the second CRS bandwidth value being different from the first CRS bandwidth value.

19. The controlling node according to claim 18, wherein the circuitry is further configured to determine at least one parameter at least partially characterizing the configurable control channel monitoring of the at least one user equipment.

20. The controlling node according to claim 19, wherein the at least one parameter at least partially characterizing the configurable control channel monitoring of the at least one user equipment includes at least one of a parameter G and $r_{max}$, $r_{max}$ representing a maximum number of repetitions associated with a control channel and G representing an indicator used for indicating control channel resources.

21. The controlling node according to claim 19, wherein the at least one parameter at least partially characterizing the configurable control channel monitoring of the at least one user equipment includes at least one of a repetition level of a set of repetition levels associated with a control channel and an offset for a Machine-Type Communication Downlink Control Channel, MPDCCH, monitoring window.

22. The controlling node according to claim 18, wherein the circuitry is further configured to use the first CRS bandwidth value for the CRS if the presence of the at least one user equipment operating based on the configurable control channel monitoring is not detected and use the second CRS bandwidth value for the CRS if the presence of the at least one user equipment operating based on the configurable control channel monitoring is detected.

23. The controlling node according to claim 22, wherein the second CRS bandwidth value is greater than the first CRS bandwidth value.

24. The controlling node according to claim 18, wherein the circuitry is further configured to:
   determine a number of user equipments in an area operating based on the configurable control channel monitoring; and
   use the first CRS bandwidth value if the number of user equipments in the area operating based on the configurable control channel monitoring at least meets a pre-defined value and use the second CRS bandwidth value if the number of user equipments in the area operating based on the configurable control channel monitoring does not at least meet the pre-defined value.

25. The controlling node according to claim 18, wherein the circuitry is further configured to at least one of:
   indicate to at least one other node the controlling node's ability to control the bandwidth of the CRS based on the determining the presence of the at least one user equipment operating based on the configurable control channel monitoring; and
   inform at least one other node of the controlled bandwidth of the CRS.

26. A measuring node, the measuring node comprising:
circuitry, the circuitry configured to:
   obtain a bandwidth of a cell-specific reference signal, CRS, for at least one resource associated with configurable control channel monitoring, the bandwidth of the CRS being controlled based on:
      a determined presence of at least one user equipment operating based on the configurable control channel monitoring; and
      a determined first subset of time resources and a second subset of time resources in which a first CRS bandwidth value is used for the first subset of time resources and a second CRS bandwidth value is used for the second set of time resources, the second subset being different from the first subset and the second CRS bandwidth value being different from the first CRS bandwidth value; and
   perform at least one operational task based on the obtained bandwidth.

27. The measuring node according to claim 26, wherein the determined presence of the at least one user equipment operating based on the configurable control channel monitoring is determined by determining at least one parameter at least partially characterizing the configurable control channel monitoring.

28. The measuring node according to claim 27, wherein the at least one parameter at least partially characterizing the configurable control channel monitoring of the at least one user equipment includes at least one of:
   a parameter G, G representing an indicator used for indicating control channel resources;
   a parameter and $r_{max}$, $r_{max}$ representing a maximum number of repetitions associated with a control channel;
   a repetition level of a set of repetition levels associated with a control channel; and
   an offset for a Machine-Type Communication Downlink Control Channel, MPDCCH, monitoring window.

29. The measuring node according to claim 26, wherein the obtained bandwidth of the CRS for the at least one resource associated with the configurable control channel monitoring is different from a second bandwidth of a CRS for at least one other resource that is not associated with the configurable control channel monitoring.

30. The measuring node according to claim 26, wherein the obtained bandwidth of the CRS is further controlled based on whether a number of user equipments in an area operating based on the configurable control channel monitoring at least meets a pre-defined value.

31. The measuring node according to claim 26, wherein the circuitry is further configured to obtain at least one time resource in which the obtained bandwidth applies.

32. The measuring node according to claim 26, wherein the circuitry is further configured to at least one of:
   determine that a carrier associated with the bandwidth of the CRS is a lean carrier; and
   indicate to at least one other node a result of obtaining the bandwidth.

33. The measuring node according to claim 26, wherein the circuitry is further configured to perform the at least one operational task based on the obtained bandwidth of the CRS by at least one of performing a radio measurement, a timing acquisition, a control channel demodulation, and a control channel decoding.

34. A controlling node, the controlling node comprising:
   a determining module configured to determine a presence of at least one user equipment operating based on a configurable control channel monitoring; and
   a controlling module configured to control a bandwidth of a cell-specific reference signal, CRS, based on the determining the presence of the at least one user equipment operating based on a configurable control channel monitoring, the controlling the bandwidth of the CRS comprising:
      determining a first subset of time resources and a second subset of time resources; and
      using a first CRS bandwidth value for the first subset of time resources and a second CRS bandwidth value for the second set of time resources, the second subset being different from the first subset and the second CRS bandwidth value being different from the first CRS bandwidth value.

35. A measuring node, the measuring node comprising:
   an obtaining module configured to obtain a bandwidth of a cell-specific reference signal, CRS, for at least one resource associated with configurable control channel monitoring, the bandwidth of the CRS being controlled based on:
  a determined presence of at least one user equipment operating based on the configurable control channel monitoring; and
  a determined first subset of time resources and a second subset of time resources in which a first CRS bandwidth value is used for the first subset of time resources and a second CRS bandwidth value is used for the second set of time resources, the second subset being different from the first subset and the second CRS bandwidth value being different from the first CRS bandwidth value; and
a performing module configured to perform at least one operational task based on the obtained bandwidth.

* * * * *